US012066175B2

(12) United States Patent
Cohen

(10) Patent No.: US 12,066,175 B2
(45) **Date of Patent: *Aug. 20, 2024**

(54) INTEGRATED LIGHTING MODULE

(71) Applicant: AMP Plus, Inc., Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,787

(22) Filed: Jun. 5, 2023

(65) Prior Publication Data

US 2023/0383939 A1 Nov. 30, 2023

Related U.S. Application Data

(63) Continuation of application No. 17/522,808, filed on Nov. 9, 2021, now Pat. No. 11,668,458.

(51) Int. Cl.

| | |
|---|---|
| ***F21V 29/77*** | (2015.01) |
| ***F21V 7/04*** | (2006.01) |
| ***F21V 23/00*** | (2015.01) |
| ***F21Y 115/10*** | (2016.01) |

(52) U.S. Cl.

CPC ............ *F21V 29/773* (2015.01); *F21V 7/041* (2013.01); *F21V 23/007* (2013.01); *F21Y 2115/10* (2016.08)

(58) Field of Classification Search

CPC ...... F21V 29/773; F21V 7/041; F21V 23/007; F21Y 2115/10

See application file for complete search history.

(56) References Cited

U.S. PATENT DOCUMENTS

| | | | |
|---|---|---|---|
| 1,133,535 | A | 3/1915 | Cain |
| 1,471,340 | A | 10/1923 | Knight |
| 1,856,356 | A | 5/1932 | Owen |

(Continued)

FOREIGN PATENT DOCUMENTS

| | | | |
|---|---|---|---|
| EP | 3521688 | A1 | 7/2019 |
| WO | WO2010051985 | A1 | 5/2010 |

(Continued)

OTHER PUBLICATIONS

US 10,816,169 B1, 10/2020, Danesh (withdrawn)

(Continued)

*Primary Examiner* — Abdulmajeed Aziz
*Assistant Examiner* — Jessica M Apenteng
(74) *Attorney, Agent, or Firm* — Eric Kelly

(57) ABSTRACT

An integrated-lighting-module may have a heat sink module, a LED light chip, an optical reflector, and a holder/trim, and optionally a driver cap. The driver cap may be configured to hold a driver within the driver cap to power the LED light chip. The driver cap may attach to a top of the heat sink module. The heat sink module may be finned at various locations. The holder may attach to the heat sink module with the optical reflector and the LED light chip disposed between elements of the holder and elements of the heat sink module. Trim, such as MR16 sized trim, a lamp, and/or a lens holder, may attach to bottom flanges of the holder. The integrated-lighting-module may be adjusted without interfering with the trim. The holder may be trim in some embodiments.

17 Claims, 27 Drawing Sheets

(56) References Cited

U.S. PATENT DOCUMENTS

| | | | |
|---|---|---|---|
| 2,352,913 A | 7/1944 | Parker | |
| 2,758,810 A | 8/1956 | Good | |
| 2,802,933 A | 8/1957 | Broadwin | |
| 3,104,087 A | 9/1963 | Budnick | |
| 3,773,968 A | 11/1973 | Copp | |
| 3,913,773 A | 10/1975 | Copp | |
| 4,880,128 A | 11/1989 | Jorgensen | |
| 4,919,292 A | 4/1990 | Hsu | |
| 5,303,894 A | 4/1994 | Deschamps | |
| 5,420,376 A | 5/1995 | Rajecki | |
| 5,957,573 A | 9/1999 | Wedekind | |
| 6,521,833 B1 | 2/2003 | DeFreitas | |
| 6,967,284 B1 | 11/2005 | Gretz | |
| 7,784,754 B2 | 8/2010 | Nevers | |
| 7,857,275 B2 | 12/2010 | de la Borbolla | |
| 7,950,832 B2 | 5/2011 | Tanaka | |
| 8,235,549 B2 | 8/2012 | Gingrich, III | |
| 8,322,897 B2 | 12/2012 | Blincoe | |
| 8,408,759 B1 * | 4/2013 | Rashidi | F21V 17/002 362/240 |
| 8,545,064 B2 | 10/2013 | Blincoe | |
| 8,845,144 B1 | 9/2014 | Davis | |
| 8,926,133 B2 | 1/2015 | Booth | |
| 9,039,254 B2 | 5/2015 | Danesh | |
| 9,151,457 B2 | 10/2015 | Pickard | |
| 9,404,639 B2 | 8/2016 | Bailey | |
| 9,523,493 B2 | 12/2016 | Chen | |
| 9,605,842 B1 | 3/2017 | Davis | |
| 9,673,597 B2 | 6/2017 | Lee | |
| 9,696,021 B2 | 7/2017 | Wronski | |
| 9,797,562 B2 | 10/2017 | Dabiet | |
| 9,854,642 B2 | 12/2017 | Kashani | |
| 9,890,942 B2 | 2/2018 | Lin | |
| 9,945,548 B2 | 4/2018 | Williams | |
| 9,964,266 B2 | 5/2018 | Danesh | |
| 10,072,805 B2 | 9/2018 | Bailey | |
| D832,218 S | 10/2018 | Wronski | |
| D833,977 S | 11/2018 | Danesh | |
| 10,139,059 B2 | 11/2018 | Danesh | |
| 10,244,607 B1 | 3/2019 | Kashani | |
| D847,414 S | 4/2019 | Danesh | |
| D847,415 S | 4/2019 | Danesh | |
| 10,247,390 B1 | 4/2019 | Kopitzke | |
| D848,375 S | 5/2019 | Danesh | |
| D851,046 S | 6/2019 | Peng | |
| 10,378,738 B1 | 8/2019 | Davis | |
| 10,408,395 B2 | 9/2019 | Danesh | |
| 10,408,396 B2 | 9/2019 | Wronski | |
| D864,877 S | 10/2019 | Danesh | |
| 10,488,000 B2 | 11/2019 | Danesh | |
| 10,551,044 B2 | 2/2020 | Peng | |
| 10,563,850 B2 | 2/2020 | Danesh | |
| D877,957 S | 3/2020 | Kopitzke | |
| 10,591,120 B2 | 3/2020 | Bailey | |
| 10,609,785 B1 | 3/2020 | Fardadi | |
| 10,616,968 B2 | 4/2020 | Wang | |
| 10,663,127 B2 | 5/2020 | Danesh | |
| 10,663,153 B2 | 5/2020 | Nikooyan | |
| 10,753,558 B2 | 8/2020 | Danesh | |
| 10,805,997 B2 | 10/2020 | Wang | |
| 10,816,148 B2 | 10/2020 | Danesh | |
| D901,398 S | 11/2020 | Danesh | |
| D902,871 S | 11/2020 | Danesh | |
| D903,605 S | 12/2020 | Danesh | |
| D905,327 S | 12/2020 | Williams | |
| D907,284 S | 1/2021 | Danesh | |
| 10,975,570 B2 | 4/2021 | Shen | |
| 10,982,829 B2 | 4/2021 | Danesh | |
| 10,989,390 B2 | 4/2021 | Lotfi | |
| 11,022,259 B2 | 6/2021 | Bailey | |
| 11,028,982 B2 | 6/2021 | Danesh | |
| 11,047,538 B2 | 6/2021 | Danesh | |
| D924,467 S | 7/2021 | Danesh | |
| D925,109 S | 7/2021 | Danesh | |
| 11,060,705 B1 | 7/2021 | Danesh | |
| 11,067,231 B2 | 7/2021 | Lotfi | |
| 11,085,597 B2 | 8/2021 | Danesh | |
| 11,118,768 B2 | 9/2021 | Danesh | |
| 2014/0254177 A1 | 9/2014 | Danesh | |
| 2015/0009676 A1 | 1/2015 | Danesh | |
| 2015/0233556 A1 | 8/2015 | Danesh | |
| 2015/0276185 A1 | 10/2015 | Bailey | |
| 2016/0312987 A1 | 10/2016 | Danesh | |
| 2016/0348860 A1 | 12/2016 | Bailey | |
| 2016/0348861 A1 | 12/2016 | Bailey | |
| 2017/0005460 A1 | 1/2017 | Lee | |
| 2017/0045213 A1 | 2/2017 | Williams | |
| 2017/0138576 A1 | 5/2017 | Peng | |
| 2017/0167672 A1 | 6/2017 | Stauner | |
| 2017/0167699 A1 | 6/2017 | Schubert | |
| 2017/0290129 A1 | 10/2017 | Kashani | |
| 2018/0231197 A1 | 8/2018 | Danesh | |
| 2018/0372284 A1 | 12/2018 | Danesh | |
| 2019/0049080 A1 | 2/2019 | Danesh | |
| 2019/0063701 A1 | 2/2019 | Lotfi | |
| 2019/0093836 A1 | 3/2019 | Danesh | |
| 2019/0242552 A1 * | 8/2019 | Liu | F21V 5/02 |
| 2019/0360664 A1 * | 11/2019 | Liu | F21V 7/048 |
| 2019/0394849 A1 | 12/2019 | Wang | |
| 2020/0056752 A1 | 2/2020 | Danesh | |
| 2020/0088365 A1 * | 3/2020 | MacLeish | E04F 11/1836 |
| 2020/0116340 A1 | 4/2020 | Nikooyan | |
| 2020/0158302 A1 | 5/2020 | Danesh | |
| 2020/0232624 A1 | 7/2020 | Lotfi | |
| 2020/0236755 A1 | 7/2020 | Wang | |
| 2020/0291652 A1 | 9/2020 | Shen | |
| 2020/0348000 A1 | 11/2020 | Bailey | |
| 2020/0386375 A1 | 12/2020 | Danesh | |
| 2020/0393118 A1 | 12/2020 | Danesh | |
| 2021/0010647 A1 | 1/2021 | Danesh | |
| 2021/0010663 A1 | 1/2021 | Nikooyan | |
| 2021/0033268 A1 | 2/2021 | Danesh | |
| 2021/0041070 A1 | 2/2021 | Danesh | |
| 2021/0071836 A1 | 3/2021 | Danesh | |
| 2021/0080084 A1 | 3/2021 | Danesh | |
| 2021/0262650 A1 | 8/2021 | Danesh | |

FOREIGN PATENT DOCUMENTS

| | | |
|---|---|---|
| WO | WO2018237294 A2 | 12/2018 |
| WO | WO2018237294 A3 | 12/2018 |
| WO | WO2019046310 A1 | 3/2019 |
| WO | WO2019133669 A1 | 7/2019 |
| WO | WO2019222259 A1 | 11/2019 |
| WO | WO2019241198 A1 | 12/2019 |
| WO | WO2021051101 A1 | 3/2021 |

OTHER PUBLICATIONS

US 10,969,069 B2, 04/2021, Danesh (withdrawn)

DMF DRD2 Product Publicly available at least as early as Sep. 6, 2018 Website: https://www.dmflighting.com/product/drd2/.

DMF DRD4 Product Publicly available at least as early as Sep. 6, 2018 Website: https://www.dmflighting.com/product/drd4/.

ELCO E247 Product Publicly available at least as early as Sep. 6, 2018 See attached concurrently filed NPL document with two product images of this ELCO E247 Product.

SORAA LED Optical Light Engine See: https://res.cloudinary.com/soraa/image/upload/v1516986148/resources/misc/ole-more-info-pdf.pdf.

IMTRA Tide PowerLED Light Fixture See: https://www.imtra.com/1806fa8d-4593-40f4-bbf0-f9a833e92148/lighting-light-fixtures-detail.htm Publicly available at least as early as 2012.

ELCO 4" Round LED Reflector Insert Publicly available at least as early as Mar. 23, 2021 Website: https://elcolighting.com/products/4-round-led-reflector-insert.

ELCO 4" Five-Color Temperature Switch LED Reflector Inserts Publicly available at least as early as Mar. 23, 2021 Website: https://elcolighting.com/node/1432026.

SORAA Vivid MR16—GU10; https://www.soraa.com/products/19-MR16-GU10.php (last visited Nov. 9, 2021).

(56) References Cited

OTHER PUBLICATIONS

NORA Lighting, NIOB-2RNDC https://noralighting.com/product/niob-2rndc/.
NORA Lighting, NIO-4RPH https://noralighting.com/product/nio-4rph/.
NORA Lighting, NIOB-1RNG https://noralighting.com/product/niob-1rng/.
NORA Lighting https://noralighting.com/product-category/products/pendants/cylinder/.
NORA Lighting https://noralighting.com/product-category/products/pendants/ilene-mini-cylinder/.
BRUCK Lighting https://brucklighting.com/download/b/GX15/Spec%20Sheets/GX15%20Cylinder%20Multi-Mount%20Spec%20Sheet.pdf.
Elite LED Lighting https://iuseelite.com/product-category/architectural-cylinders/?characteristics=c%2Bq.
DMF Lighting https://www.dmflighting.com/wp-content/uploads/2021/12/DMFLighting_DCC_Spec_Sheet.pdf.

* cited by examiner

INTEGRATED LIGHTING MODULE

PRIORITY NOTICE

The present patent application is a continuation of U.S. non-provisional patent application Ser. No. 17/522,808 filed on Nov. 9, 2021, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to integrated lighting modules and more specifically to an integrated lighting module wherein its heat sink module may have an upper portion that is finned and a bottom portion that is non-finned, wherein a diameter of the upper finned portion may be larger than a diameter of the bottom non-finned portion.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

There is a need in the art for an integrated lighting module that has a heat sink module with an upper finned portion and bottom non-finned portion, wherein a diameter of the upper finned portion is larger than a diameter of bottom non-finned portion as this will allow for increased heat dissipation efficiencies, increased lumens output, while still be configured for a specific sized trim, such as, but not limited, to MR16 sized trim.

There is a need in the art for an integrated lighting module that may be adjusted without interfering with its associated trim.

It is to these ends that the present invention has been developed.

BRIEF SUMMARY OF THE INVENTION

To minimize the limitations in the prior art, and to minimize other limitations that will be apparent upon reading and understanding the present specification, the present invention may describe an integrated-lighting-module and/or a lighting system that comprises the integrated-lighting-module.

In some embodiments, the integrated-lighting-module may have a driver cap, a finned heat sink module, a LED light chip, an optical reflector, and a holder. In some embodiments, the driver cap may be configured to hold a driver within the driver cap to power the LED light chip. In some embodiments, the driver cap may attach to a top of the heat sink module. In some embodiments, the holder may attach to the heat sink module with the optical reflector and the LED light chip disposed between elements of the holder and elements of the heat sink module. In some embodiments, the heat sink module may be finned at various locations (of the heat sink module). In some embodiments, where the heat sink module may be finned at its upper portions, the heat sink module may have a larger diameter than its non-finned bottom portion, which in turn may provide for increased heat dissipation and greater lumens output. In some embodiments, the holder may screw upon the bottom portion of the heat sink module with the optical reflector and the LED light chip disposed between the holder and the heat sink module. In some embodiments, trim, such as MR16 sized trim, may attach to bottom flanges of the holder. In some embodiments, the integrated-lighting-module may be adjusted without interfering with the trim. In some embodiments, the holder may be trim in some embodiments.

It is an objective of the present invention to provide an integrated lighting module.

It is another objective of the present invention to provide an integrated-lighting-module wherein its heat sink module may have an upper portion that is finned and a lower/bottom portion that is non-finned, wherein a diameter of the upper finned portion may be larger than a diameter of the bottom non-finned portion.

It is another objective of the present invention to provide an integrated-lighting-module wherein its heat sink module that may be used with MR16 sized trim, a lamp holder, and/or a lens holder.

It is yet another objective of the present invention to provide an integrated-lighting-module wherein its heat sink module that may be adjusted without interfering with the trim.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1:
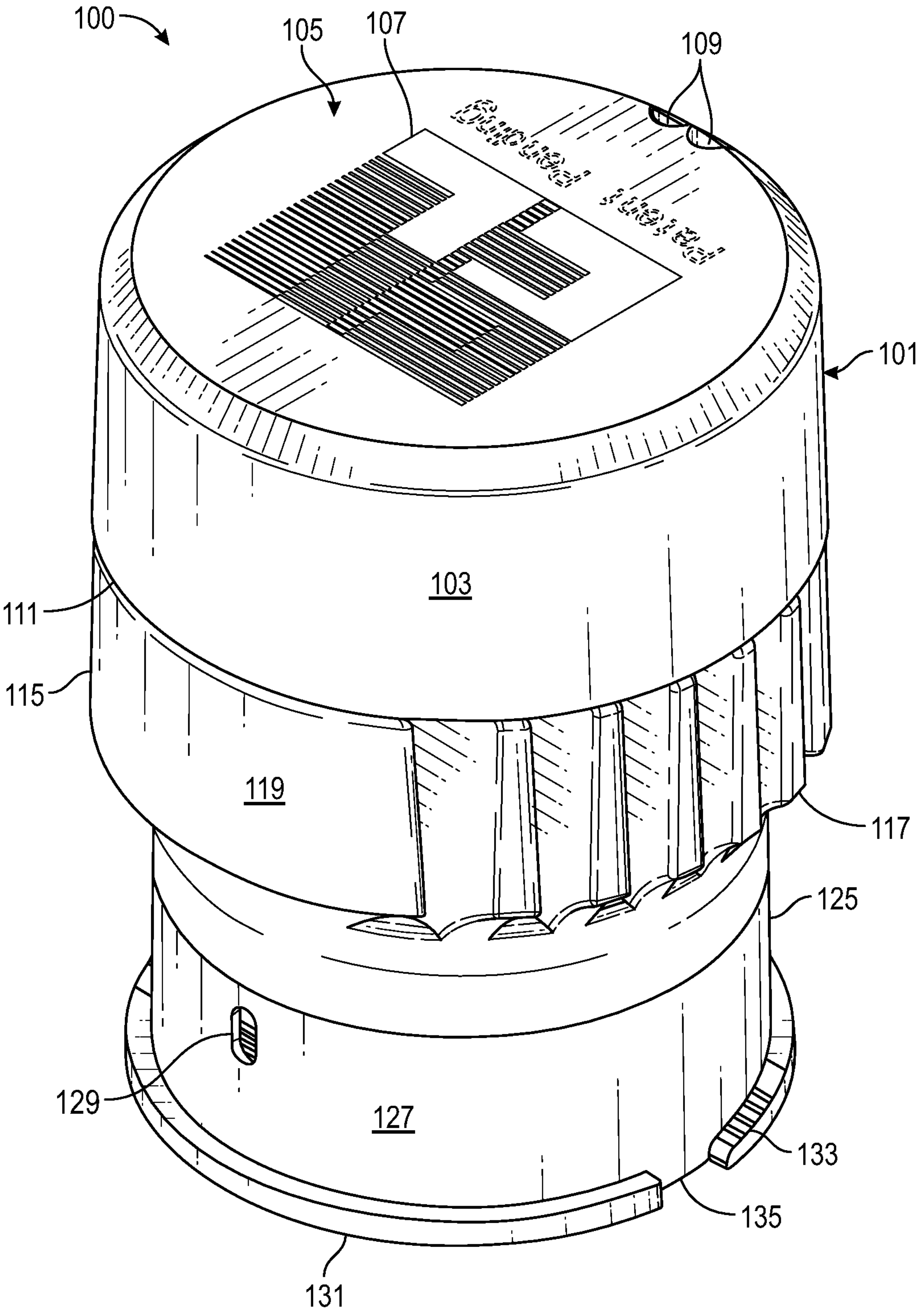
FIG. 1 illustrates a top perspective view of an integrated-lighting-module (in an assembled configuration).

100 integrated-lighting-module 100
101 driver cap 101 (driver housing 101)
103 side-wall 103 (first side-wall 103)
105 top 105 (first top 105)
107 indicator 107
109 aperture 109
111 bottom 111 (first bottom 111)
115 heat sink module 115
117 fin 117
119 side wall 119
125 holder 125
127 side-wall 127 (second side-wall 127)
129 thread lock notch 129
131 twist-lock-flange 131
133 twist-lock-teeth 133
135 twist-lock-opening 135
701 LED light chip 701 (light emitting diode element 701)
703 optical reflector 703
901 heat-sink-module-top-diameter 901
903 holder-side-wall-diameter 903

905 twist-lock-flange-outer-diameter 905
907 assembled-integrated-lighting-module-length 907
909 assembled-holder-length 909
911 assembled-driver-cap-and-heat-sink-module-length 911
1001 fin-radius 1003
1003 flange-radius 1003
1115 top 1115 (second top 1115)
1117 aperture 1117 (of heat sink 115)
1119 aperture 1119 (of heat sink 115)
1121 aperture 1121 (of heat sink 115)
1123 threading 1123 (of heat sink 115)
1125 bottom 1125 (of heat sink 115)
1131 top-hole 1131 (of optical reflector 703)
1133 bottom 1133 (second bottom 1133)
1141 top 1141 (third top 1141)
1143 internal-threading 1143 (of holder 125)
1201 frame 1201
1203 frame hole 1203
1211 can 1211
1221 trim 1221
1299 full assembly 1299
1301 communication-region-between-driver-cap-and-heat-sink-module 1301
1303 communication-region-between-heat-sink-module-and-holder 1303
1305 communication-region-between-driver-cap-and-heat-sink-module 1305
1307 communication-region-between-driver-cap-and-heat-sink-module 1307
1309 communication-region-between-heat-sink-module-and-holder 1309
1311 communication-region-between-heat-sink-module-and-holder 1311
1401 region-for-housing-LED-chip 1401
1403 region-for-housing-reflector 1403
1501 volume 1501
1503 volume 1503
1701 upper-region 1701
1703 middle-region 1703
1705 bottom-region 1705
1711 upper-region 1711
1713 lower-region 1713
1721 upper-finned-region 1721
1723 conical-frustrum-region 1723
1725 cylindrical-region 1725
1727 bottom-threaded-region 1727
1731 finned-upper-region 1731
1733 middle-transition-region 1733
1735 bottom-region 1735

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 illustrates a top perspective view of an integrated-lighting-module 100 (in an assembled configuration). Note, "integrated-lighting-module" may also be referred to as "integrated lighting module" (i.e., with or without the hyphens). Note, unless otherwise specified "integrated-lighting-module 100" may refer to the assembled configuration for integrated-lighting-module 100 such as that shown in FIG. 1. In some embodiments, integrated-lighting-module 100 may also be known as a driver assembly. In some embodiments, integrated-lighting-module 100 may comprise sub-components of a driver cap 101, a heat sink module 115, and a holder 125. In some embodiments, driver cap 101 may be referred to as a driver housing 101. In some embodiments, driver cap 101 may attach to a top portion of heat sink module 115 (and in some embodiments, this attachment may be removable). In some embodiments, a bottom portion of heat sink module 115 may attach to holder 125 (and in some embodiments, this attachment may be removable). In some embodiments, heat sink module 115 may be disposed between driver cap 101 and holder 125. In some embodiments, heat sink module 115 may be in communication with driver cap 101 and with holder 125. In some embodiments, driver cap 101 may not be touching holder 125.

Continuing discussing FIG. 1, in some embodiments, driver cap 101 may be substantially hollow (void space) and cylindrical member (e.g., with side-wall 103) that may be closed (capped) at one end (its top 105) and open at its other end (bottom 111). In some embodiments, this hollow void space that driver cap 101 may surround may be for various electronics, such as, but not limited to a driver. In some embodiments, top 105 and bottom 111 of driver cap 101 may be disposed opposite from each other, separated by side-wall 103. In some embodiments, top 105 may comprise one or more aperture(s) 109. In some embodiments, top 105 may have one or more aperture(s) 109. In some embodiments, the one or more aperture(s) 109 may be through holes. In some embodiments, the one or more aperture(s) 109 may facilitate passage of wires, cabling, and/or the like. In some embodiments, top 105 may have one or more indicator(s) 107. In some embodiments, top 105 may have one or more indicator(s) 107. In some embodiments, the one or more indicator(s) 107 may be one or more of: word(s), writing, number(s), graphic(s), logo(s), trademark(s), serial number(s), model number(s), certification indication(s), status indication(s), lot number(s), patent number(s), tracking number(s), registration number(s), and/or the like. In some embodiments, bottom 111 of driver cap 101 may be open, which may allow various electronics, such as, but not limited to, the driver to be inserted and used while in the hollow void space that driver cap 101 may surround. In some embodiments, bottom 111 of driver cap 101 may be open, which may allow driver cap 101 to attach (removably so in some embodiments) to a top portion of heat sink module 115. In some embodiments, a nature (type or style) of attachment between driver cap 101 and heat sink module 115 may be one or more of: friction fit, press fit, snap fit, threaded fit, attached using adhesives, welded fit, attached using screws, attached using bolts, attached using tacks, and/or the like.

Continuing discussing FIG. 1, in some embodiments, heat sink module 115 may be a substantially hollow (surrounding void space) and cylindrical member that may be substantially finned along its upper (top) portion and threaded along its bottom portion. In some embodiments, heat sink module 115 may be finned with a plurality of fins 117. In some embodiments, heat sink module 115 may be fined (e.g., with fin(s) 117) or non-finned (e.g., no fins 117). In some embodiments, heat sink module 115 may be finned with one or more fin(s) 117. In some embodiments, the one or more fin(s) 117 may encourage, facilitate, and/or provide for heat transfer, such as, but not limited, heat radiated out from these one or more fin(s) 117 into the surrounding environment. In some embodiments, the one or more fin(s) 117 may allow cooling of heat sink module 115. In some embodiments, where sides of heat sink module 115 are not finned with fins 117, there may be side walls 119. In some embodiments, heat sink module 115 may comprise side walls 119. In some embodiments, heat sink module 115 may have side walls 119. In some embodiments, heat sink module 115 may house various electronics, such as, but not limited to, LED light chip 701 (see e.g., FIG. 7 and FIG. 11 for LED light chip 701). In some embodiments, LED light chip 701 may also be referred to as LED element 701. Note, "LED" as used herein may mean "light emitting diode." In some embodiments LED light chip 701 may be a light source that may comprise one or more LEDs. In some embodiments LED light chip 701 may be a light source that may comprise one or more light source(s) that may or may not include LEDs. In some embodiments, heat sink module 115 may house at least some portion of optical reflector 703 (see e.g., FIG. 7 and FIG. 11 for optical reflector 703). In some embodiments, heat sink module 115 may be substantially (mostly) closed at its top end (aside from various apertures and the fins 117). In some embodiments, heat sink module 115 may be substantially (mostly) open at its bottom end.

In some embodiments, heat sink module 115 may attach to holder 125. In some embodiments, heat sink module 115 may be removably attached to holder 125. In some embodiments, heat sink module 115 may be removably attached to holder 125 via complimentary threading on each respective component (such as, threading 1123 of heat sink module 115 and internal-threading 1143 of holder 125—see e.g., FIG. 11).

Continuing discussing FIG. 1, in some embodiments, holder 125 may be a substantially hollow and cylindrical member that may be open at both ends. In some embodiments, holder 125 may hold heat sink module 115. In some embodiments, holder 125 may hold optical reflector 703. In some embodiments, holder 125 may hold both heat sink module 115 and optical reflector 703. In some embodiments, when integrated-lighting-module 100 may be assembled, at least a portion of heat sink module 115 and/or at least a portion of optical reflector 703 may be located within holder 125. In some embodiments, a main cylindrical side wall portion of holder 125 may be denoted as side-wall 127. In some embodiments, holder 125 may comprise side-wall 127, which may be a side wall of holder 125. In some embodiments, within side-wall 127 may be one or more holes, denoted as thread lock notch 129. In some embodiments, a given thread lock notch 129 may be a through hole through side-wall 127. In some embodiments, a given thread lock notch 129 may be threaded to receive a threaded screw and/or a threaded bolt. In some embodiments, such a threaded screw and/or a threaded bolt passing through thread lock notch 129, may be used to securely lock optical reflector 703 onto a bottom portion of heat sink module 115.

Continuing discussing FIG. 1, in some embodiments, a bottom portion of holder 125 may have a twist-lock flange 131. In some embodiments, twist-lock flange 131 may be one or more flange(s) that run around and extend outwardly from a bottom portion of holder 125. In some embodiments, twist-lock flange 131 may be two or more flange(s) that run around and extend outwardly from a bottom portion of holder 125; wherein each such flange may be separated by a gap in the given flange, wherein this gap may be denoted as twist-lock-opening 135. In some embodiments, at one end of each such gap (i.e., at one end of twist-lock-opening 135) may be a tapered portion of twist-lock flange 131 with gripping teeth, denoted as twist-lock-teeth 133. In some embodiments, the two or more twist-lock flanges 131, with two twist-lock-teeth 133, and two twist-lock-openings 135, may be used to removably attached holder 125 to a given trim 1221 (see e.g., FIG. 12A and FIG. 12B for trim 1221). In some embodiments, flange 131 may be an outside annular flange of a portion of holder 125 (such as a bottom portion of holder 125). In some embodiments, flange 131 may be an outside annular flange, with or without breaks/interruptions in a continuity of that given annular flange. In some embodiments, a bottom portion of holder 125 may have an annular flange (such as, but not limited to flange 131). See e.g., FIG. 1.

In some embodiments, optical reflector 703 may be held (secured) by holder 125. In some embodiments, optical reflector 703 may be held within holder 125. In some embodiments, this may be accomplished by a set screw passing at least partially through a given thread lock notch 129 of holder 125 to engage optical reflector 703. In some embodiments, side-wall 127 of holder 125 may have at least one thread lock notch 129. See e.g., FIG. 1.

In some embodiments, holder 125 may be removed via twisting (un-twisting) action, which in turn may then allow for a change in optics (such as, but not limited, to use of louvers, spread lens, and/or the like). In some embodiments, holder 125 may have adjustability via twisting (or un-twisting) action. In some embodiments, adjusting holder 125 may not require tools.

In some embodiments, a given integrated-lighting-module 100 may comprise: a driver cap 101, a heat sink module 115, a LED light chip 701, an optical reflector 703, and a holder 125. See e.g., FIG. 1, FIG. 11 and/or FIG. 15.

Figure 2:
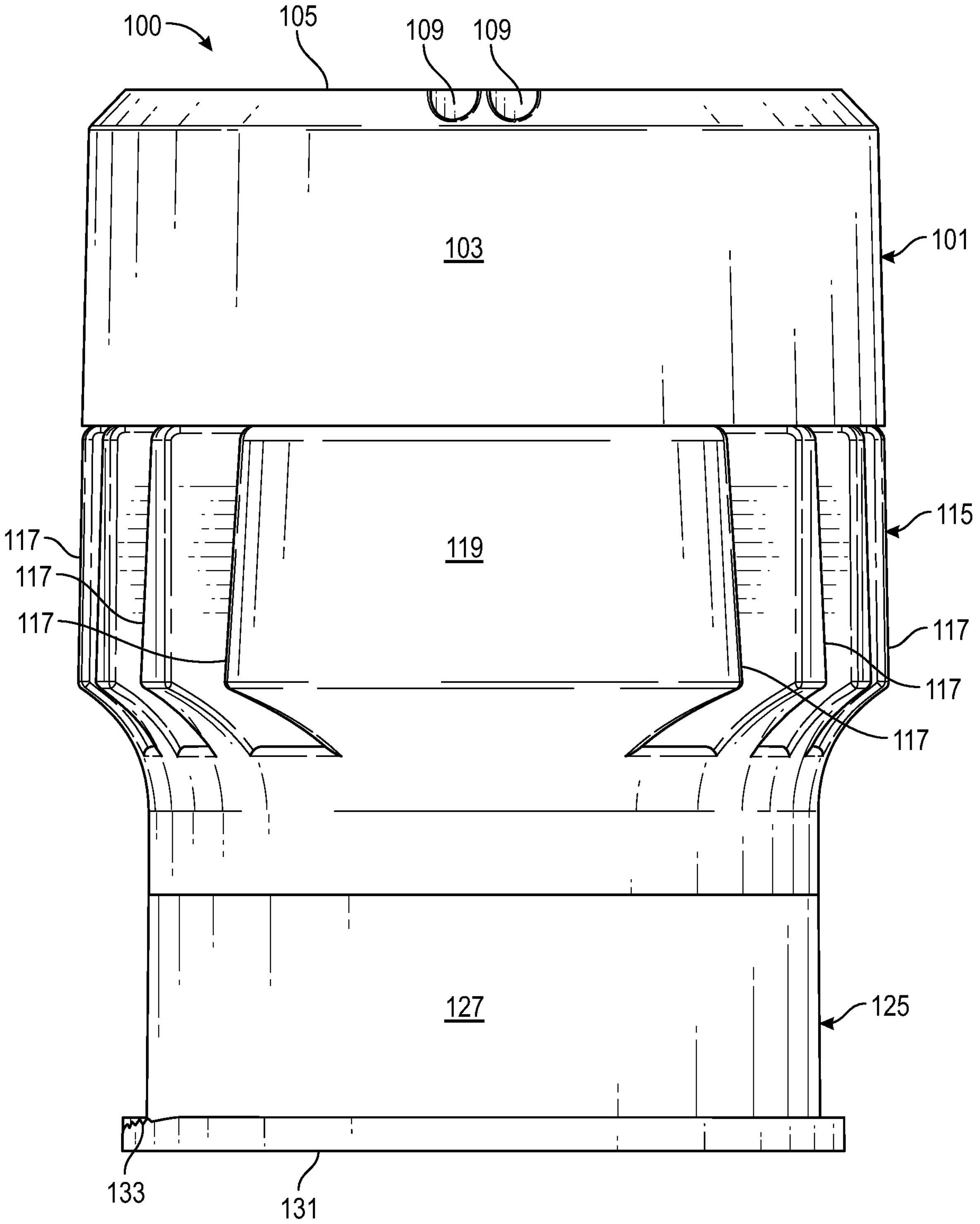
FIG. 2 illustrates a front view of the integrated-lighting-module of FIG. 1.

FIG. 2 illustrates a front view of integrated-lighting-module 100. Portions of driver cap 101, of heat sink module 115, and of holder 125 of integrated-lighting-module 100 may be seen in FIG. 2. Portions of aperture(s) 109 of driver cap 101 may be seen. Portions of sidewall 103 of driver cap 101 may be seen. Portions of fins 117 of heat sink module 115 may be seen. Portions of side wall 119 of heat sink module 115 may be seen. Note as shown in FIG. 2, the finned portions of heat sink module 115 may be wider than a bottom portion of heat sink module 115. That is, the bottom of heat sink module 115, where the main opening to the interior of heat sink module 115 may be located, may have a smaller diameter as compared to an upper finned portion of heat sink module 115; and in turn this configuration may facilitate more efficient heat dissipation and/or overall improved performance. For example, and without limiting the scope of the present invention, note in FIG. 2 as the viewer progresses upwards from a bottom of heat sink module 115 that its diameters increases, such that most of the finned region has a greater diameter than the bottom non-finned regions (note, this can also be seen in figures FIG. 3 through FIG. 5). Note, heat sink module 115 may have a curve that transitions from its smaller diameter bottom regions to its upper finned portions with the larger diameter. This curve in heat sink module 115 may permit integrated-lighting-module 100 to be adjusted without hitting/interfering with trim 1221 (see FIG. 12A or FIG. 12B for trim 1221). (The bottom of heat sink module 115 may be denoted as bottom 1125 and may be shown in FIG. 11.) Portion of side-wall 127 of holder 125 may be seen in FIG. 2. Portions of twist-lock-flange 131 and twist-lock-teeth 133 of holder 125 may also be seen in FIG. 2.

Figure 3:
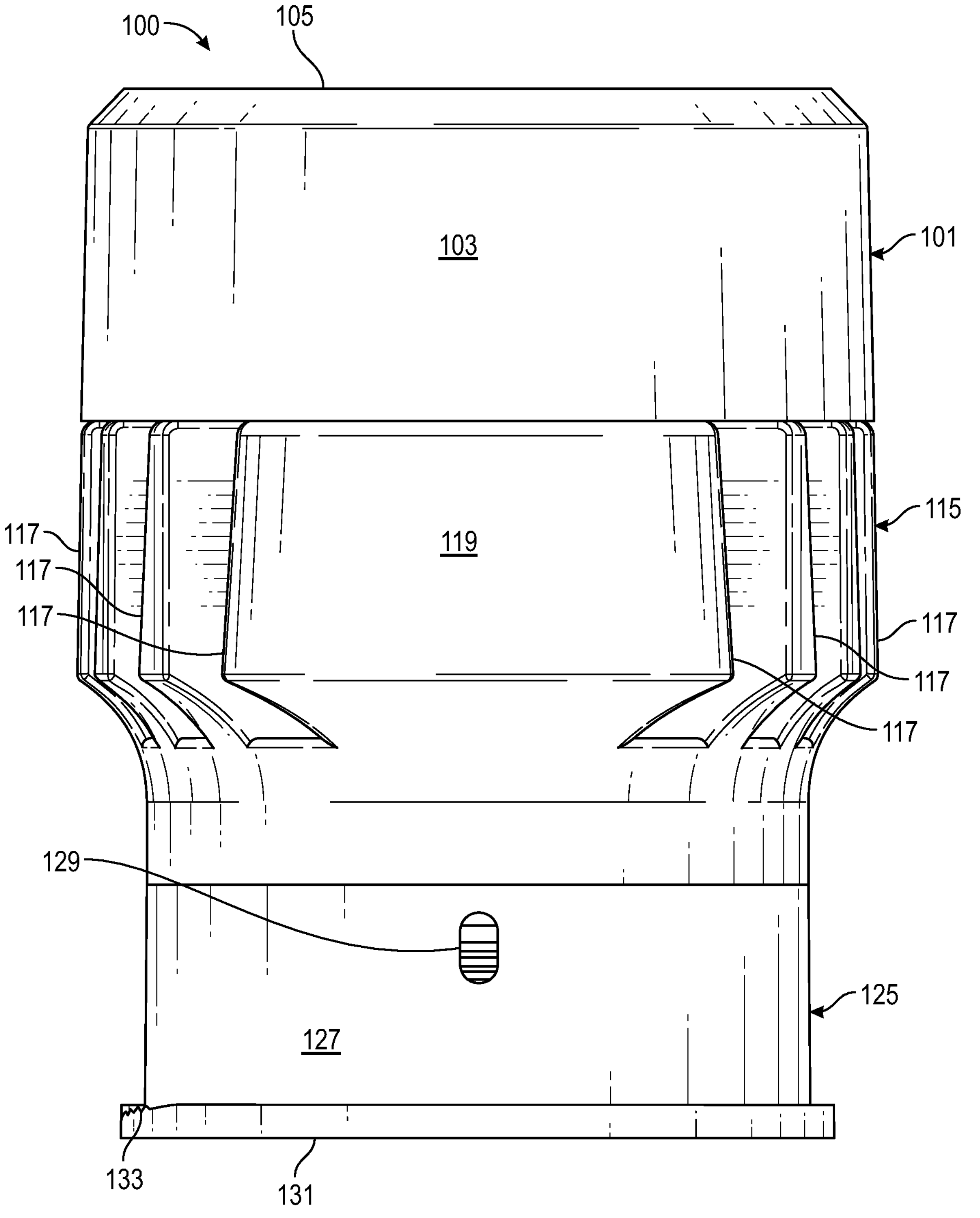
FIG. 3 illustrates a rear view of the integrated-lighting-module of FIG. 1.

FIG. 3 illustrates a rear view of integrated-lighting-module 100. Portions of driver cap 101, of heat sink module 115, and of holder 125 of integrated-lighting-module 100 may be seen in FIG. 3. Portions of side-wall 103 of driver cap 101 may be seen. Portions of fins 117 of heat sink module 115 may be seen. Portions of side wall 119 of heat sink module 115 may be seen. Note as shown in FIG. 3, the finned portions of heat sink module 115 may be wider than a bottom portion of heat sink module 115. That is, the bottom (bottom 1125) of heat sink module 115, where the main opening to the interior of heat sink module 115 may be located, may have a smaller diameter as compared to an upper finned portion of heat sink module 115; and in turn this configuration may facilitate more efficient heat dissipation and/or overall improved performance. (The bottom 1125 of heat sink module 115 may be shown in FIG. 11.) Portion of side-wall 127 of holder 125 may be seen in FIG. 3. A thread lock notch 129 of holder 125 may be seen in FIG. 3. Portions of twist-lock-flange 131 and twist-lock-teeth 133 of holder 125 may also be seen in FIG. 3. The view of FIG. 3 may be an opposing view as compared against the view of FIG. 2.

Figure 4:
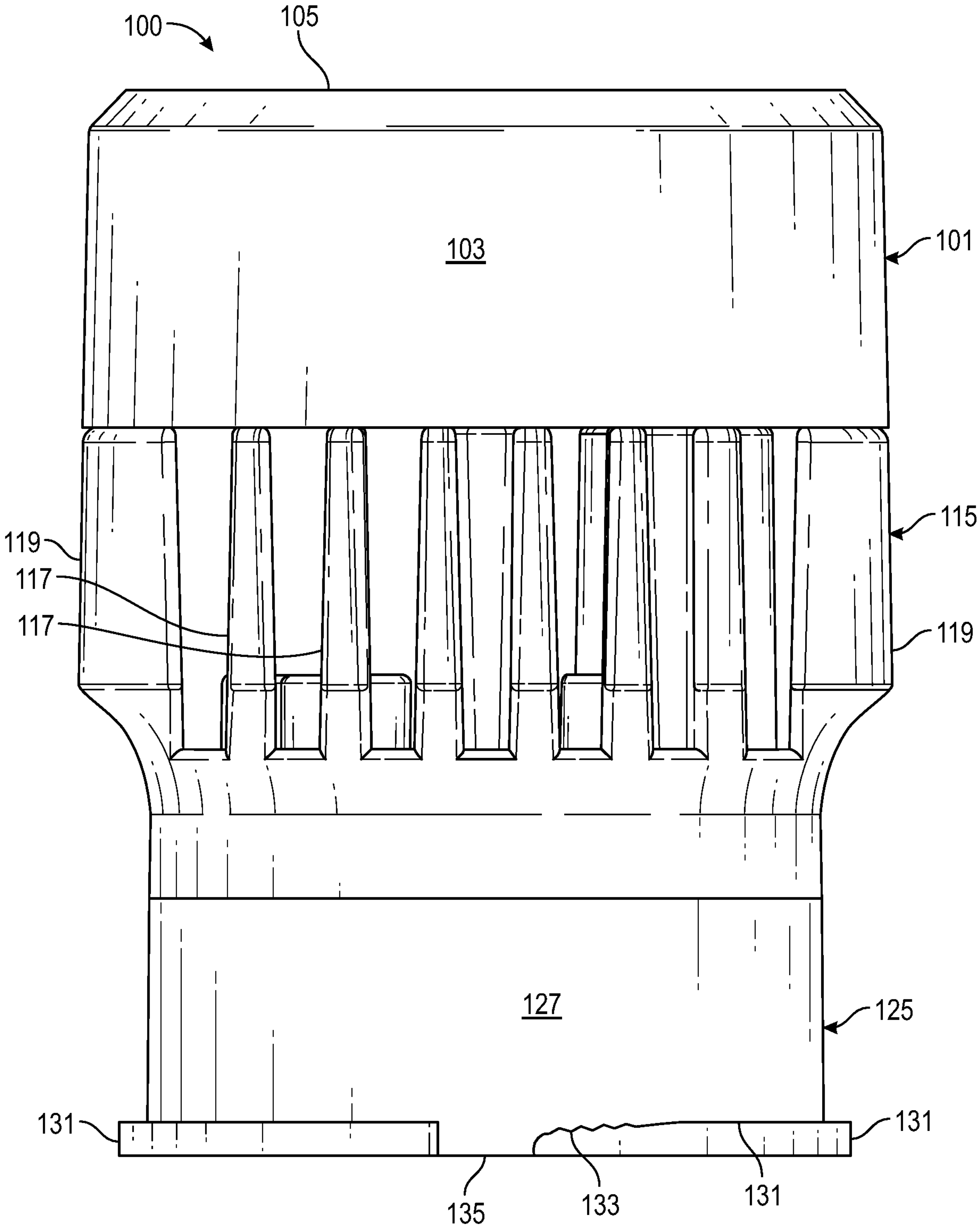
FIG. 4 illustrates a left-side view of the integrated-lighting-module of FIG. 1.

FIG. 4 illustrates a left-side view of integrated-lighting-module 100. Portions of driver cap 101, of heat sink module 115, and of holder 125 of integrated-lighting-module 100 may be seen in FIG. 4. Portions of side-wall 103 of driver cap 101 may be seen. Portions of fins 117 of heat sink module 115 may be seen. Portions of side wall 119 of heat sink module 115 may be seen. Portion of side-wall 127 of holder 125 may be seen in FIG. 4. Portions of twist-lock-flange 131 and twist-lock-teeth 133 of holder 125 may also be seen in FIG. 4.

Figure 5:
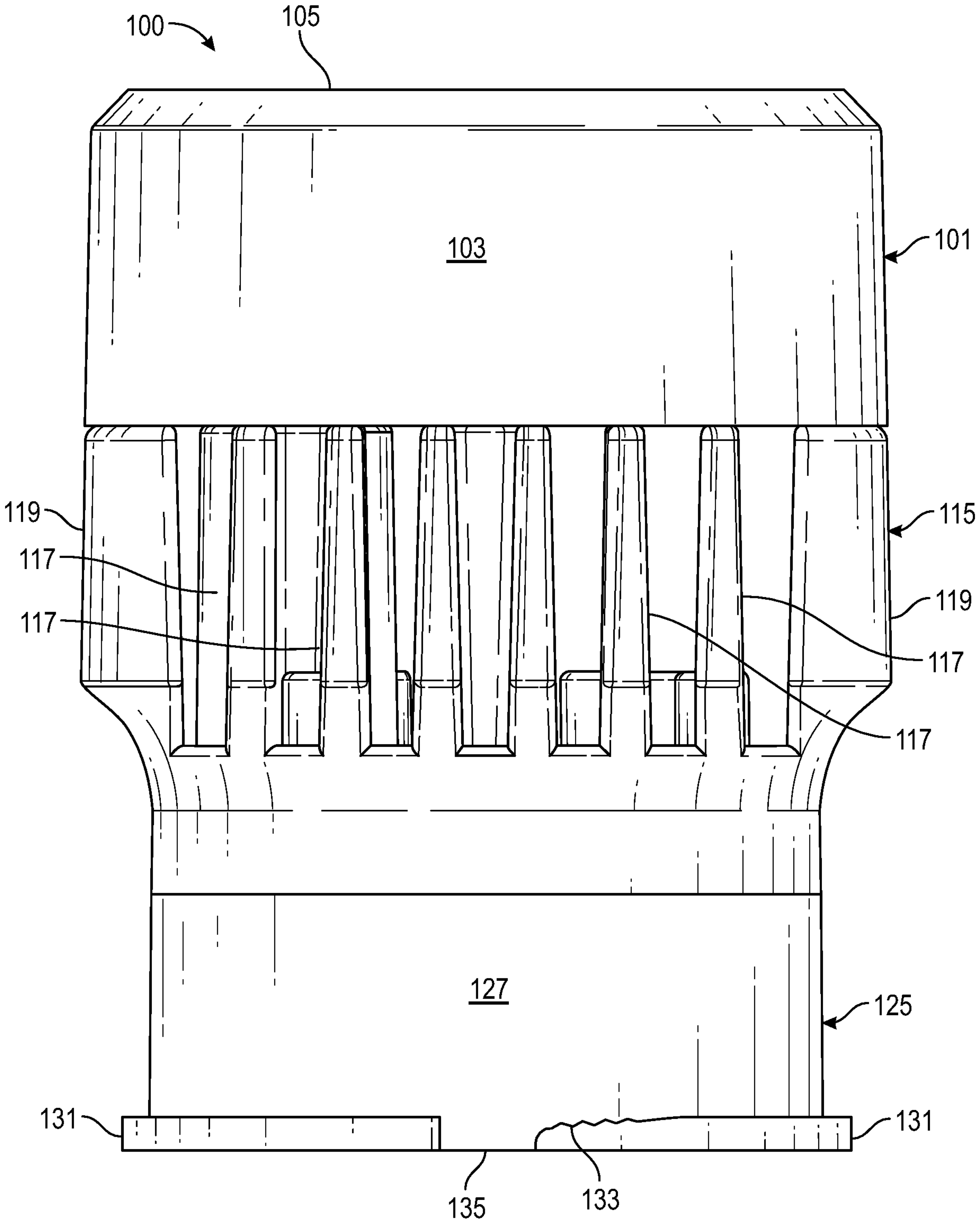
FIG. 5 illustrates a right-side view of the integrated-lighting-module of FIG. 1.

FIG. 5 illustrates a right-side view of integrated-lighting-module 100. Portions of driver cap 101, of heat sink module 115, and of holder 125 of integrated-lighting-module 100 may be seen in FIG. 5. Portions of side-wall 103 of driver cap 101 may be seen. Portions of fins 117 of heat sink module 115 may be seen. Portions of side wall 119 of heat sink module 115 may be seen. Portion of side-wall 127 of holder 125 may be seen in FIG. 5. Portions of twist-lock-flange 131 and twist-lock-teeth 133 of holder 125 may also be seen in FIG. 5. The view of FIG. 5 may be an opposing view as compared against the view of FIG. 4.

Figure 6:
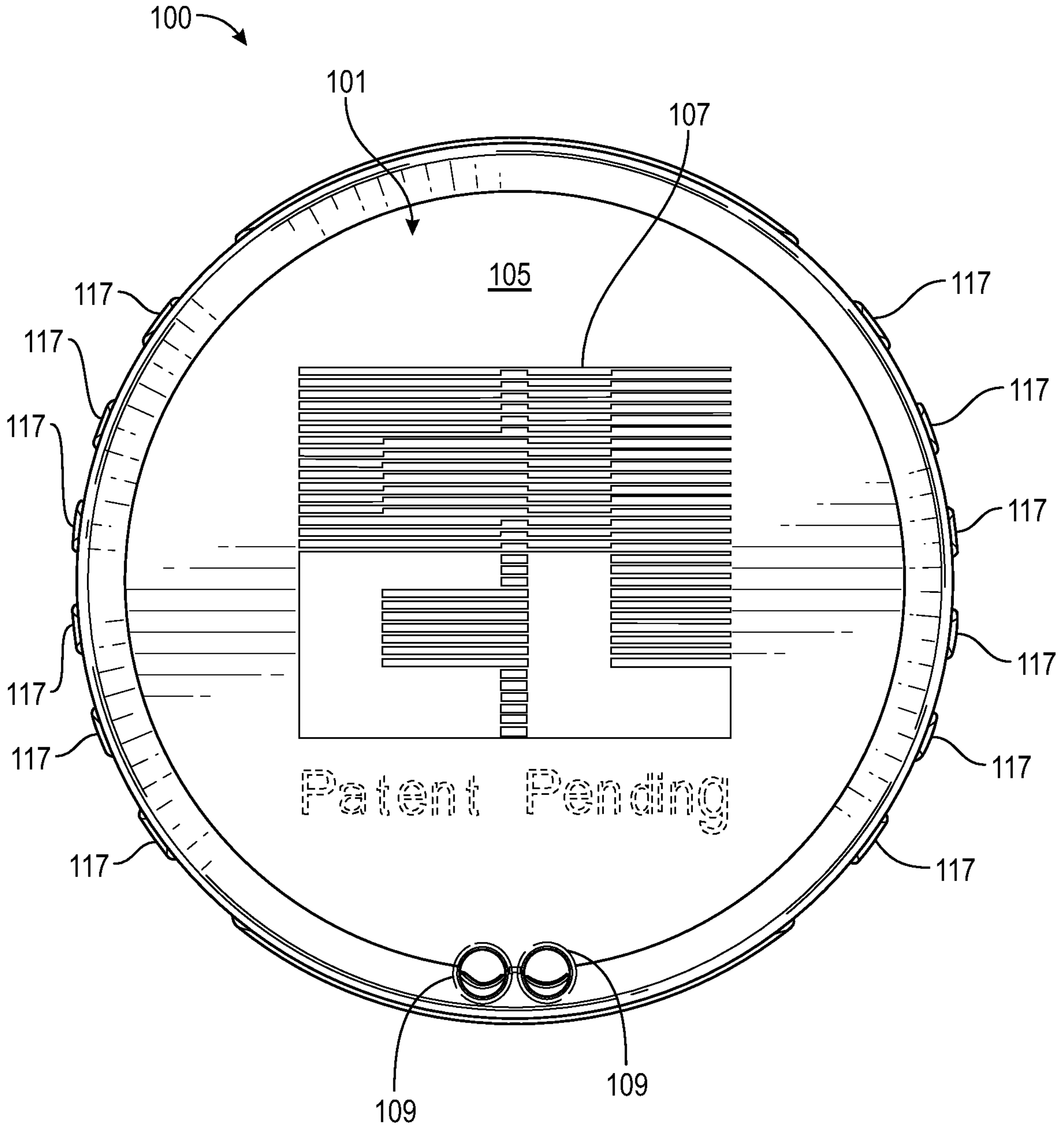
FIG. 6 illustrates a top view of the integrated-lighting-module of FIG. 1.

FIG. 6 illustrates a top view of integrated-lighting-module 100. Portions of driver cap 101 and of heat sink module 115 of integrated-lighting-module 100 may be seen in FIG. 6. Top 105 of driver cap 101 may be seen in FIG. 6. Apertures 109 of driver cap 101 may be seen in FIG. 6. Indicator 107 of driver cap 101 may be seen in FIG. 6. The outer edges of fins 117 of heat sink module 115 may be seen in FIG. 6, being wider (greater in diameter) than driver cap 101 and wider (greater in diameter) than holder 125. The outer edges of side wall 119 of heat sink module 115 may be seen in FIG. 6, being wider (greater in diameter) than driver cap 101 and wider (greater in diameter) than holder 125.

In some embodiments, first top 105 of driver cap 101 may comprise at least one aperture 109. In some embodiments, first top 105 of driver cap 101 may comprise at least one indicator 107. See e.g., FIG. 1 and FIG. 6.

Figure 7:
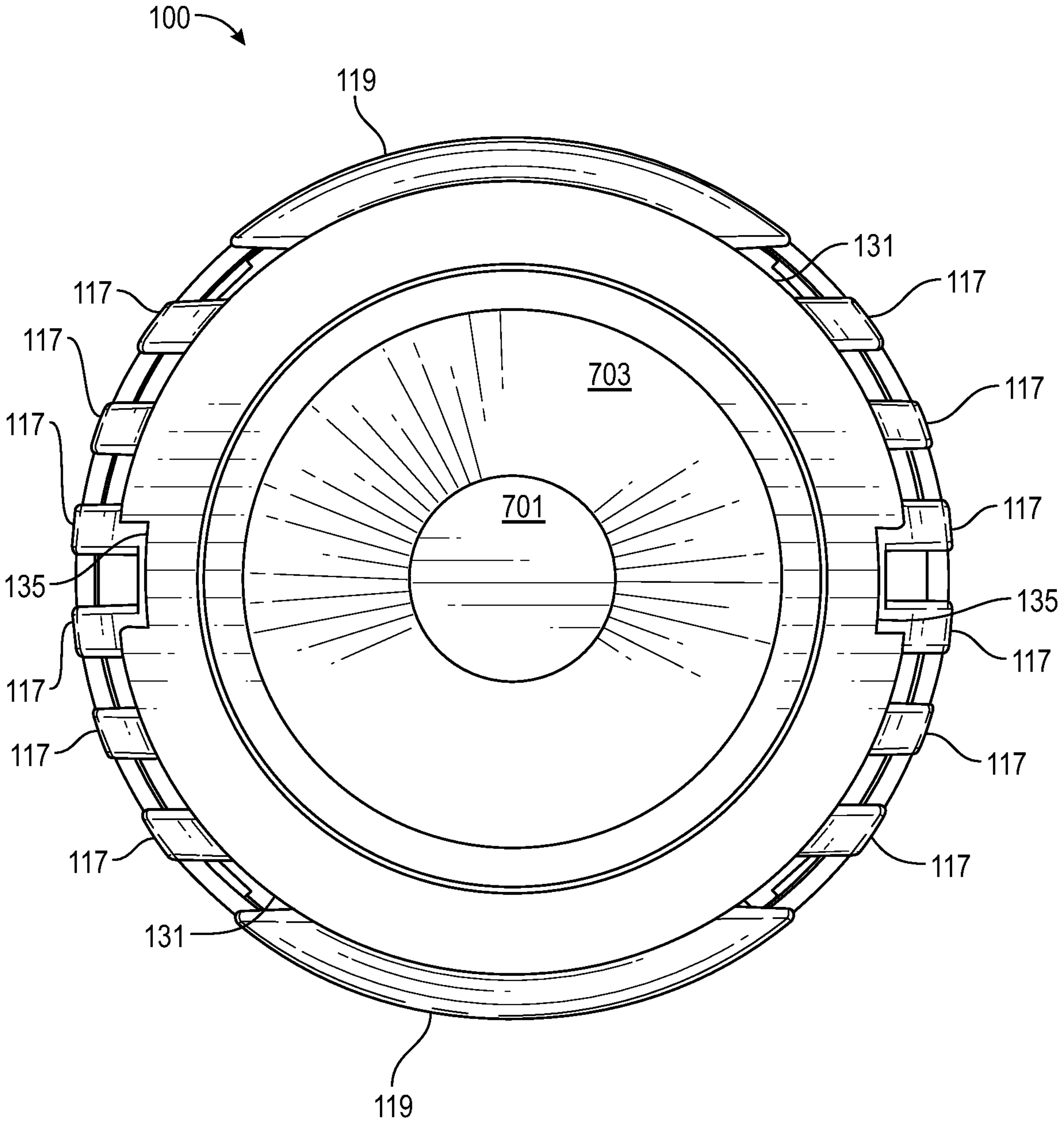
FIG. 7 illustrates a bottom view of the integrated-lighting-module of FIG. 1.

FIG. 7 illustrates a bottom view of integrated-lighting-module 100. Portions of holder 125, optical reflector 703, of LED light chip 701, and of heat sink module 115 of integrated-lighting-module 100 may be seen in FIG. 7. Bottom portions of twist-lock-flanges 131 of holder 125 may be seen in FIG. 7. Bottom portions of twist-lock-openings 135 of holder 125 may be seen in FIG. 7. The two twist-lock-openings 135 may be disposed opposite of each other, separating two different twist-lock-flanges 131. A bottom portion of optical reflector 703 may be seen in FIG. 7. In some embodiments, optical reflector 703 may reflect, direct, distribute, and/or spread out emitted light from LED light chip 701. A top center hole (top-hole 1131) of optical reflector 703 may be where emitted light from LED light chip 701 enters the bottom of optical reflector 703 (see FIG. 11 for top-hole 1131). The outer edges of fins 117 of heat sink module 115 may be seen in FIG. 7, being wider (greater in diameter) than driver cap 101 and wider (greater in diameter) than holder 125. The outer edges of side wall 119 of heat sink module 115 may be seen in FIG. 7, being wider (greater in diameter) than driver cap 101 and wider (greater in diameter) than holder 125. The view of FIG. 7 may be an opposing view as compared against the view of FIG. 6.

Figure 8:
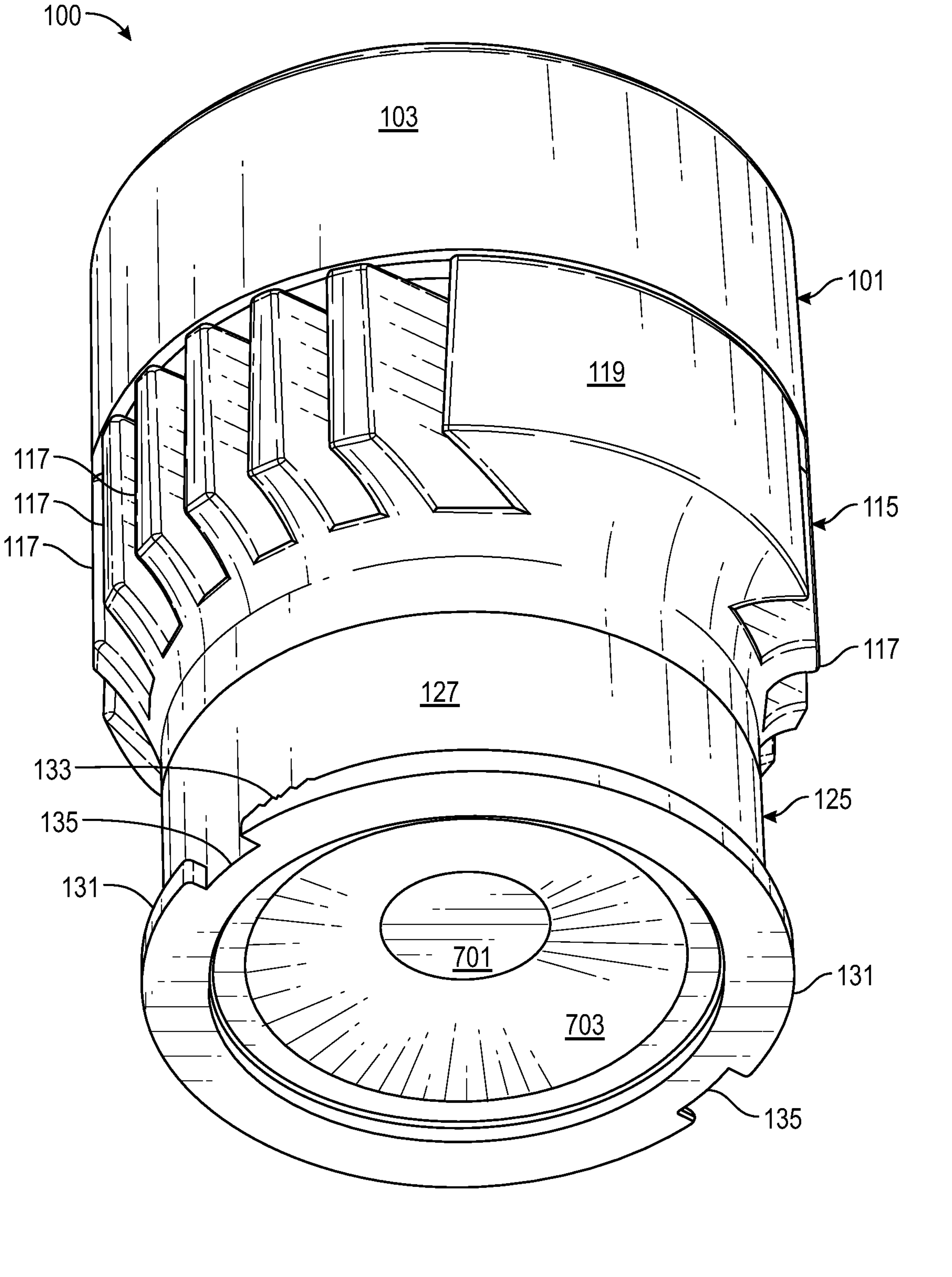
FIG. 8 illustrates a bottom perspective view of the integrated-lighting-module of FIG. 1.

FIG. 8 illustrates a bottom perspective view of integrated-lighting-module 100. Portions of driver cap 101, of heat sink module 115, of holder 125, of optical reflector 703, and of LED light chip 101, all of integrated-lighting-module 100, may be seen in FIG. 8.

Figure 9:
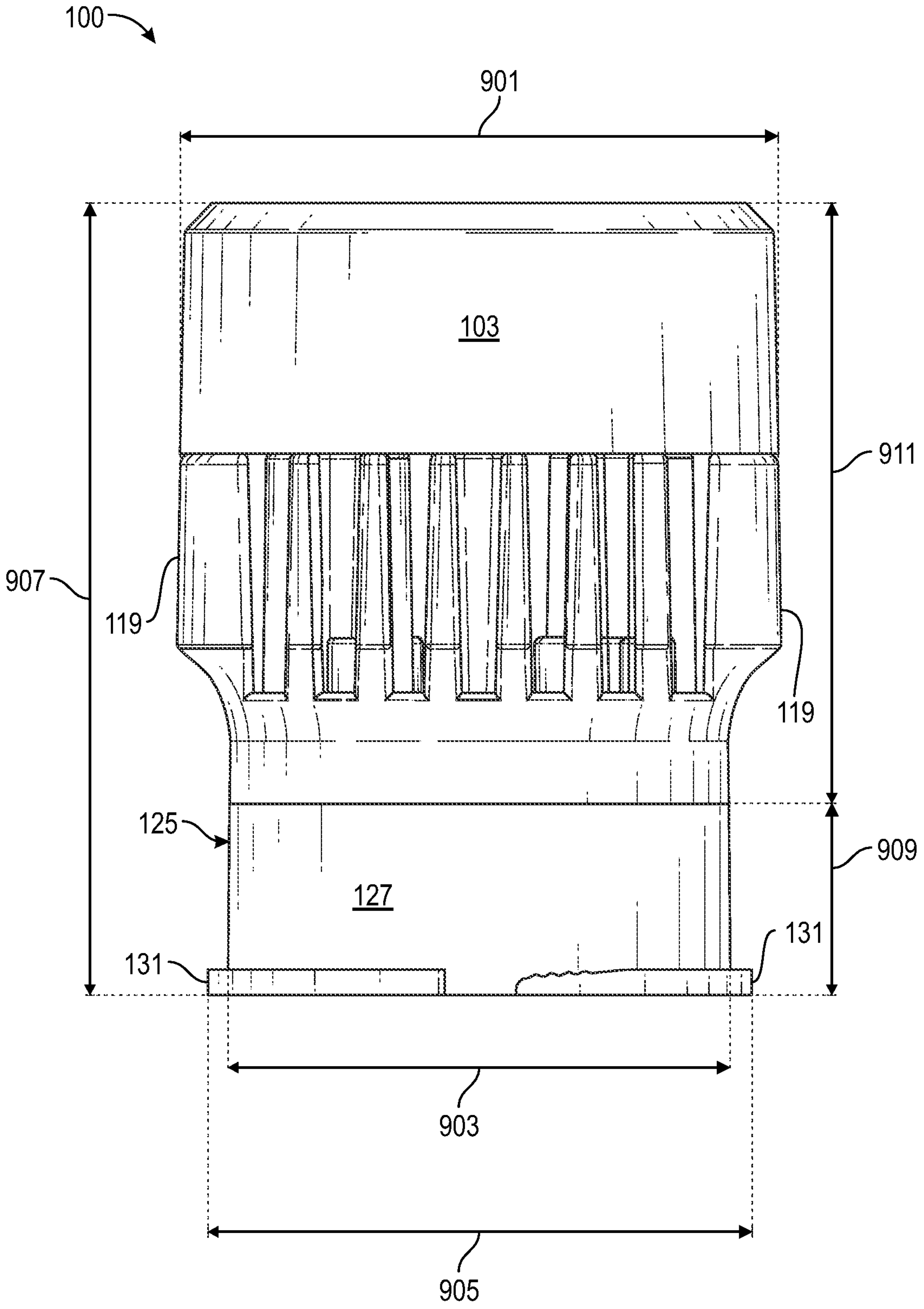
FIG. 9 illustrates the right-side view of the integrated-lighting-module of FIG. 1 while showing some dimensional relationships of the integrated-lighting-module.

FIG. 9 illustrates the right-side view of integrated-lighting-module 100 while showing some dimensional relationships of integrated-lighting-module 100. FIG. 9 may be substantially similar to identical to FIG. 5, except in FIG. 9 various dimensional call-outs and/or relationships may be shown. For example, and without limiting the scope of the present invention the following may be shown in FIG. 9: heat-sink-module-top-diameter 901, twist-lock-flange-outer-diameter 903, holder-side-wall-diameter 905, assembled-integrated-lighting-module-length 907, assembled-holder-length 909, and/or assembled-driver-cap-and-heat-sink-module-length 911.

Continuing discussing FIG. 9, in some embodiments, heat-sink-module-top-diameter 901 may be an outer (outside) diameter of heat-sink-module 115 as measured near a top of heat sink module 115. In some embodiments, heat-sink-module-top-diameter 901 may be 55.65 mm (millimeters), plus or minus 5 mm. (In some embodiments, 55.65 mm may be about 2.19 inches.) In some embodiments, holder-side-wall-diameter 903 may be an outer (outside) diameter of holder 125 as measured at side-wall 127 of holder 125. In some embodiments, holder-side-wall-diameter 903 may be 45.80 mm, plus or minus 5 mm. (45.80 mm may be about 1.80 inches.) In some embodiments, twist-lock-flange-outer-diameter 905 may be an outer (outside) diameter across twist-lock-flange 131 of holder 125. In some embodiments, twistlock-flange-outer-diameter 905 may be 49.98 mm, plus or minus 5 mm. (49.98 mm may be about 1.97 inches.) In some embodiments, assembled-integrated-lighting-module-length 907 may be an overall length (height) of integrated-lighting-module 100, when integrated-lighting-module 100 may be in its assembled configuration. In some embodiments, assembled-integrated-lighting-module-length 907 may be 72.70 mm, plus or minus 5 mm. In some embodiments, assembled-holder-length 909 may be a length of holder 125, when holder 125 may be assembled into a given integrated-lighting-module 100 from a bottom of holder 125 towards its top (top 1141 shown in FIG. 11). In some embodiments, assembled-driver-cap-and-heat-sink-module-length 911 may be length from top 105 of driver cap 101 towards a bottom portion of heat sink module 115, below fins 117, when driver cap 101 and heat sink module 115 may be assembled into a given integrated-lighting-module 100. In some embodiments, heat-sink-module-top-diameter 901 may be greater than holder-side-wall-diameter 903; which may facilitate improved heat dissipation efficiency and/or overall improved performance. In some embodiments, a ratio of heat-sink-module-top-diameter 901 to holder-side-wall-diameter 903 may be greater than one up to and including 1.5. For example, and without limiting the scope of the present invention, a ratio of heat-sink-module-top-diameter 901 to holder-side-wall-diameter 903 may be from 1.21 to 1.22.

Figure 10:
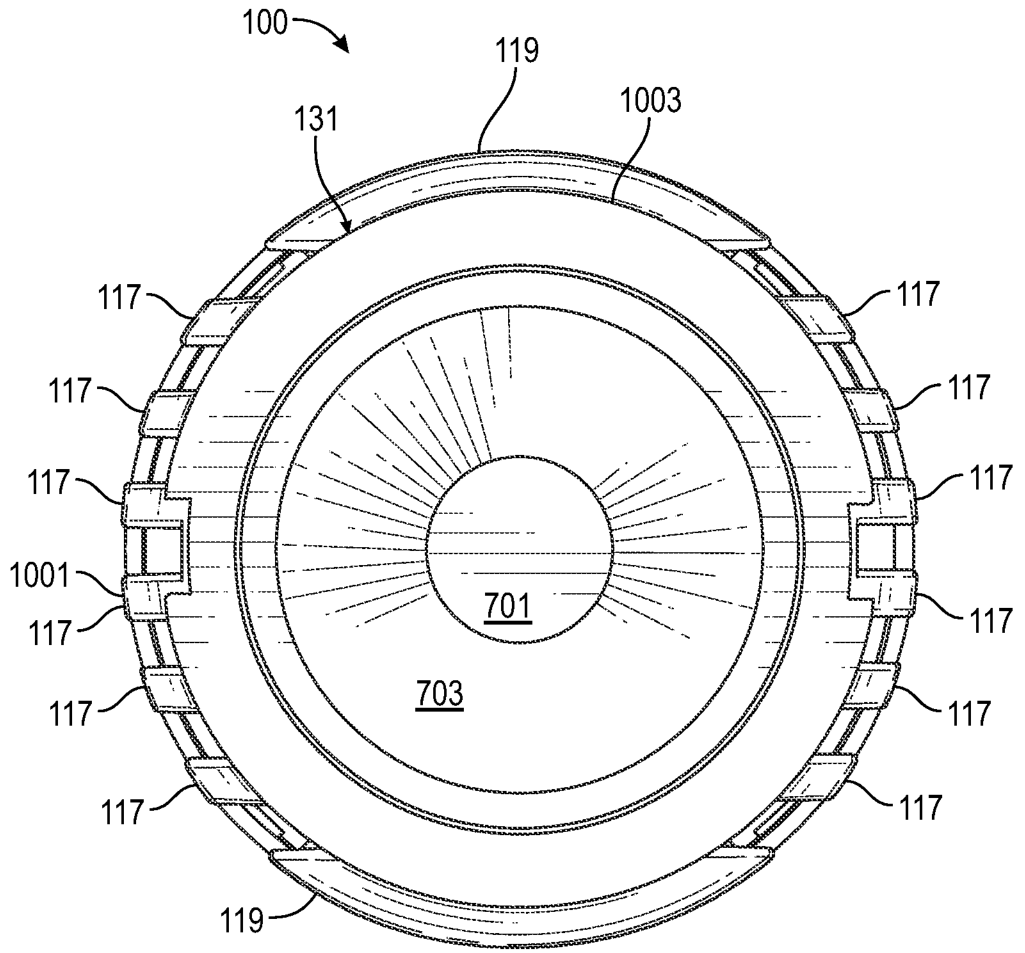
FIG. 10 illustrates the bottom view of the integrated-lighting-module of FIG. 1 while showing some dimensional relationships (e.g., radii) of the integrated-lighting-module.

FIG. 10 illustrates the bottom view of integrated-lighting-module 100 while showing some dimensional relationships (e.g., radii) of integrated-lighting-module 100. FIG. 10 may be substantially similar to FIG. 7, except in FIG. 10 two radius may be called out, fin-radius 1001 and flange-radius 1003. In some embodiments, fin-radius 1001 may be a radius as measured from out an outer fin 117 surface to a center of integrated-lighting-module 100; wherein the center is the center of the view of the figure shown in FIG. 10. In some embodiments, fin-radius 1001 may be 27.83 mm, plus or minus 2.5 mm. In some embodiments, flange-radius 1003 may be a radius from an outside edge of twist-lock-flange 131 to this center. In some embodiments, flange-radius 1003 may be 24.99 mm, plus or minus 2.5 mm.

In some embodiments, other dimensions for heat-sink-module-top-diameter 901, holder-side-wall-diameter 903, twist-lock-flange-outer-diameter 905, assembled-integrated-lighting-module-length 907, assembled-holder-length 909, assembled-driver-cap-and-heat-sink-module-length 911, fin-radius 1001, and/or flange-radius 1003 are contemplated. In some embodiments, dimensions for heat-sink-module-top-diameter 901, holder-side-wall-diameter 903, twist-lock-flange-outer-diameter 905, assembled-integrated-lighting-module-length 907, assembled-holder-length 909, assembled-driver-cap-and-heat-sink-module-length 911, fin-radius 1001, and/or flange-radius 1003 may be fixed and predetermined.

Figure 11:
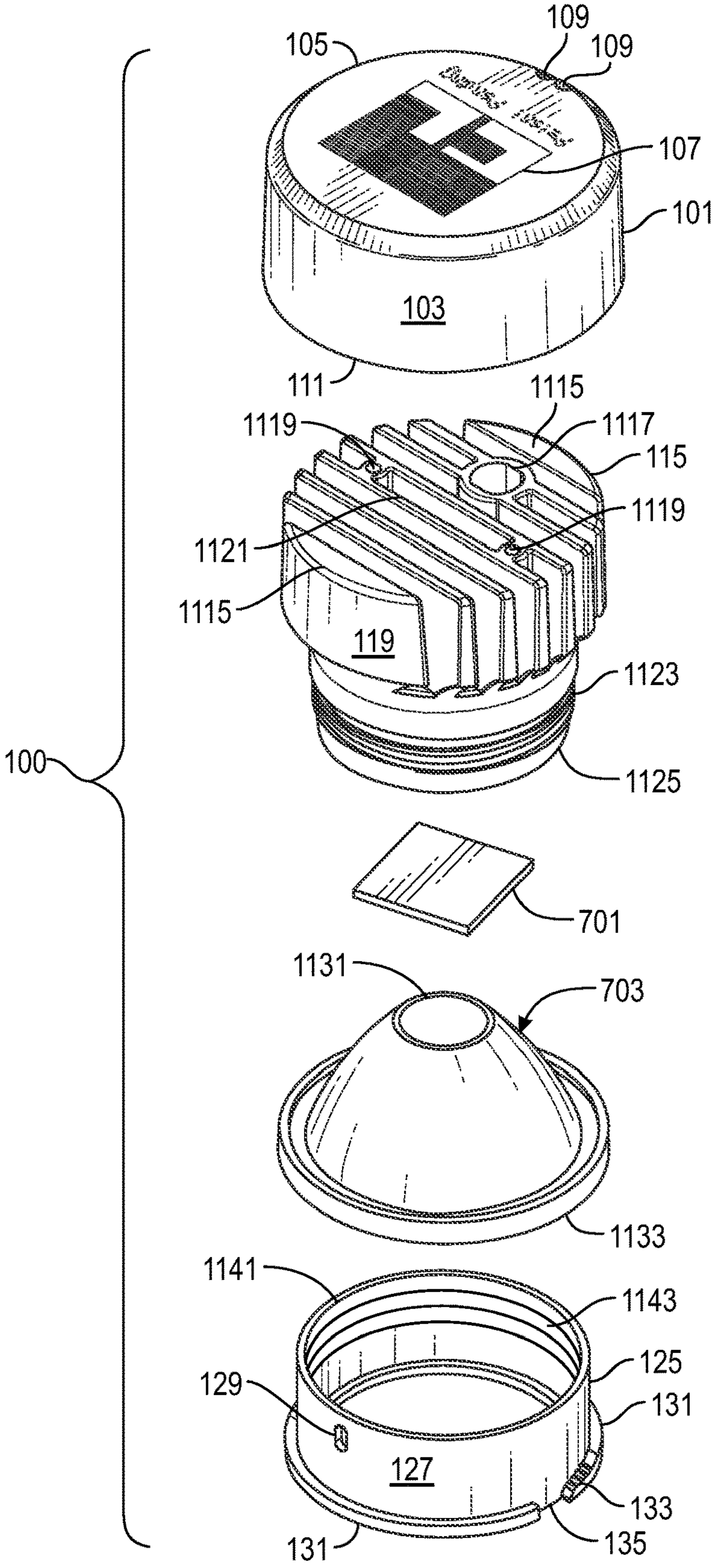
FIG. 11 illustrates an exploded top perspective view of the integrated-lighting-module of FIG. 1.

FIG. 11 illustrates an exploded top perspective view of integrated-lighting-module 100. FIG. 11 may show main sub-components separated from each other of integrated-lighting-module 100. FIG. 11 may show driver cap 101 separated from heat sink module 115. FIG. 11 may show heat sink module 115 separated from: LED light chip 701 (that may emit light), optical reflector 703, and holder 125.

Continuing discussing FIG. 11, in some embodiments, the substantially cylindrically shaped heat sink module 115 may have a top 1115 and a bottom 1125. In some embodiments, top 1115 may be disposed opposite from bottom 1125. In some embodiments, in top 1115 may be various holes and/or apertures, such as, but not limited to, aperture 1117, aperture(s) 1119, and/or aperture 1121. In some embodiments, apertures in top 1115, may be for receiving screws, bolts, wiring, cabling, and/or at least portions of electronic components. In some embodiments, aperture 1117, aperture(s) 1119, and/or aperture 1121 may be for receiving screws, bolts, wiring, cabling, and/or at least portions of electronic components. In some embodiments, at least one fin 117 may run substantially linearly (straight) across top 1115. In some embodiments, at least one fin 117 may run substantially linearly (straight) across top 1115, except where interrupted by an aperture (e.g., aperture 1117, aperture(s) 1119, and/or aperture 1121) and where two opposing regions of side wall 119 may descend from top 1115. In some embodiments, at least two fins 117 may run substantially parallel across top 1115. In some embodiments, at least two fins 117 may run substantially parallel across top 1115, except where interrupted by an aperture (e.g., aperture 1117, aperture(s) 1119, and/or aperture 1121) and where two opposing regions of side wall 119 may descend from top 1115. In some embodiments, the finned regions (of fins 117) of heat sink module 115, may occupy the majority of the upper portions of heat sink module 115. In some embodiments, bottom portions of heat sink module 115 may have no fins 117. In some embodiments, the upper finned regions of heat sink module 115 may have a greater diameter (e.g., heat-sink-module-top-diameter 901) than the none finned bottom portions of heat sink module 115 (e.g., hear or proximate to holder-side-wall-diameter 903). In some embodiments, a bottom portion of heat sink module 115 may have threading 1123. In some embodiments, threading 1123 may permit removable attachment of heat sink module 115 to optical reflector 703. In some embodiments, threading 1123 may permit removable attachment of heat sink module 115 to holder 125. In some embodiments, threading 1123 may wrap entirely around the bottom portion(s) of heat sink module 115.

Continuing discussing FIG. 11, in some embodiments, optical reflector 703 have a top (at top-hole 1131) and a bottom 1133, wherein the top may be disposed away from the bottom 1133. In some embodiments, 703 may be substantially conical in space, but without a cone's point; instead, a cone's point might reside may be replaced with top-hole 1131. In some embodiments, top-hole 1131 may permit at least some light emitted from LED light chip 701 to enter the underside (bottom) of optical reflector 703. In some embodiments, LED light chip 701 may be mounted at or proximate (near/adjacent) to top-hole 1131. In some embodiments, the underside (bottom) of optical reflector 703 may be substantially reflective and/or shiny, to facilitate reflecting at least some light out through bottom 1133, which may be substantially open. In some embodiments, optical reflector 703 may help to reflect, direct, distribute, and/or spread out at least some emitted light from LED light chip 701.

Continuing discussing FIG. 11, in some embodiments, a top 1141 of the substantially cylindrically shaped and hollow holder 125 may be shown. At least some interior surfaces of holder 125 may be seen in FIG. 11. In some embodiments, at least some portions of the interior surfaces of holder 125 may comprise internal-threading 1143. In some embodiments, 1143 may be complimentary to threading 1123 of heat sink module 115. In some embodiments, heat sink module 115 may be removably attached to holder 125. In some embodiments, threading 1123 of heat sink module 115 may be removably and complimentary threaded onto internal-threading 1143 of holder 125. In some embodiments, threading 1123 of heat sink module 115 may removably and complimentary thread onto thread lock notches 129 of holder 125. In some embodiments, holder 125 may have an upper opening at top 1141 with a (fixed and/or finite) diameter dimension selected from a range of one-half (0.5) inch to two and one-half (2.5) inches; wherein this upper opening may be in communication with at least some portion of heat sink module 115. In some embodiments, this diameter (of the upper opening at top 1141) may be selected from a range from one and one-half (1.5) inches to two and one-quarter (2.25) inches. In some embodiments, upper opening at top 1141 may be at least mostly/substantially circular.

In some embodiments, a given integrated-lighting-module 100 may comprise: a driver cap 101, a heat sink module 115, a LED light chip 701, an optical reflector 703, and a holder 125. See e.g., FIG. 11, FIG. 1, and/or FIG. 15.

In some embodiments, driver cap 101 may have first side walls 103, a first top 105 that caps the first side walls 103, and may be open at a first bottom 111. In some embodiments, first side walls 103 and first top 105 may substantially surround a first volume of driver cap 101, wherein the first volume may be configured to receive a driver. This first volume of driver cap 101 may be located beneath first top 105 and within first side walls 103. The driver may power LED light chip 701. See e.g., FIG. 11 and FIG. 1.

In some embodiments, heat sink module 115 may be finned on an upper portion for heat dissipation and heat sink module 115 may be non-finned on a bottom portion. In some embodiments, the upper portion of heat sink module 115 may have a larger diameter than the bottom portion of heat sink module 115. In some embodiments, the bottom portion of heat sink module 115 may curve and transition into the upper portion of heat sink module 115. In some embodiments, first bottom 111 of driver cap 101 may be attachable to a second top 1115, wherein second top 1115 may be top 1115 of heat sink module 115. See e.g., FIG. 11 and FIG. 1.

In some embodiments, the upper portion of heat sink module 115 may be finned with at least two fins 117. In some embodiments, at least two fins 117 may be substantially parallel and run substantially linearly across second top 1115 of heat sink module 115. In some embodiments, second top 1115 of heat sink module 115 may comprise at least one aperture (such as, but not limited to, aperture 1117, aperture 1119, and/or aperture 1121). In some embodiments, the at least one aperture (such as, but not limited to, aperture 1117, aperture 1119, and/or aperture 1121) may interrupt at least one fin 117 of heat sink module 115. In some embodiments, the bottom portion of heat sink module 115 may comprise threading 1123 for removable attachment to holder 125. See e.g., FIG. 11.

In some embodiments, LED light chip 701 may be configured to emit light. In some embodiments, optical reflector 703 may be substantially conical in shape for reflecting and directing at least some light from LED light chip 701 out of a second bottom 1133, wherein the second bottom 1133 is bottom 1133 of optical reflector 703. In some embodiments, LED light chip 701 may be disposed above top-hole 1131 of optical reflector 703 and within heat sink module 115, wherein top-hole 1131 may be located at a top of optical reflector 703. See e.g., FIG. 11 and FIG. 7.

In some embodiments, holder 125 may have second side-walls 127 that may substantially surround a second volume. In some embodiments, this second volume (of holder 125) may be configured to receive at least a portion of the bottom portion of heat sink module 115 (such as, but not limited a portion of heat sink module 115 with threading 1123). In some embodiments, holder 125 may be open at both a third top 1141 and at a third bottom, wherein third top 1141 is top 1141 of holder 125, wherein the third bottom is a bottom of holder 125. See e.g., FIG. 11.

In some embodiments, the third bottom of holder 125 may comprise two twist-lock-flanges 131 that may be configured for removable attachment to trim 1221, wherein each of the two twist-lock-flanges 131 is a flange. In some embodiments, the two twist-lock-flanges 131 may be separated from each other by two twist-lock-openings 135 that are breaks between the two twist-lock-flanges 131. In some embodiments, each of the two twist-lock-flanges 131 may begin with twist-lock-teeth 133, wherein the twist-lock-teeth 133 are configured to removably engage at least a portion of trim 1221. See e.g., FIG. 1, FIG. 7, FIG. 11, and FIG. 12A.

In some embodiments, second side-walls 127 of holder 125 may comprise at least one thread lock notch 129 that is a through hole passing through a portion of the second side-walls 127, wherein the at least one thread lock notch 129 is configured to receive at least one screw to secure a portion of optical reflector 703 against heat sink module 115. See e.g., FIG. 1 and FIG. 11.

In some embodiments, an interior surface of second side walls 127 of holder 125 may comprise internal-threading 1143 for removable attachment to heat sink module 115. In some embodiments, internal-threading 1143 of holder 125 may complimentary mate with threading 1123 of heat sink module 115 that is located on the bottom portion of heat sink module 115. See e.g., FIG. 11 and FIG. 1.

Figure 12A:
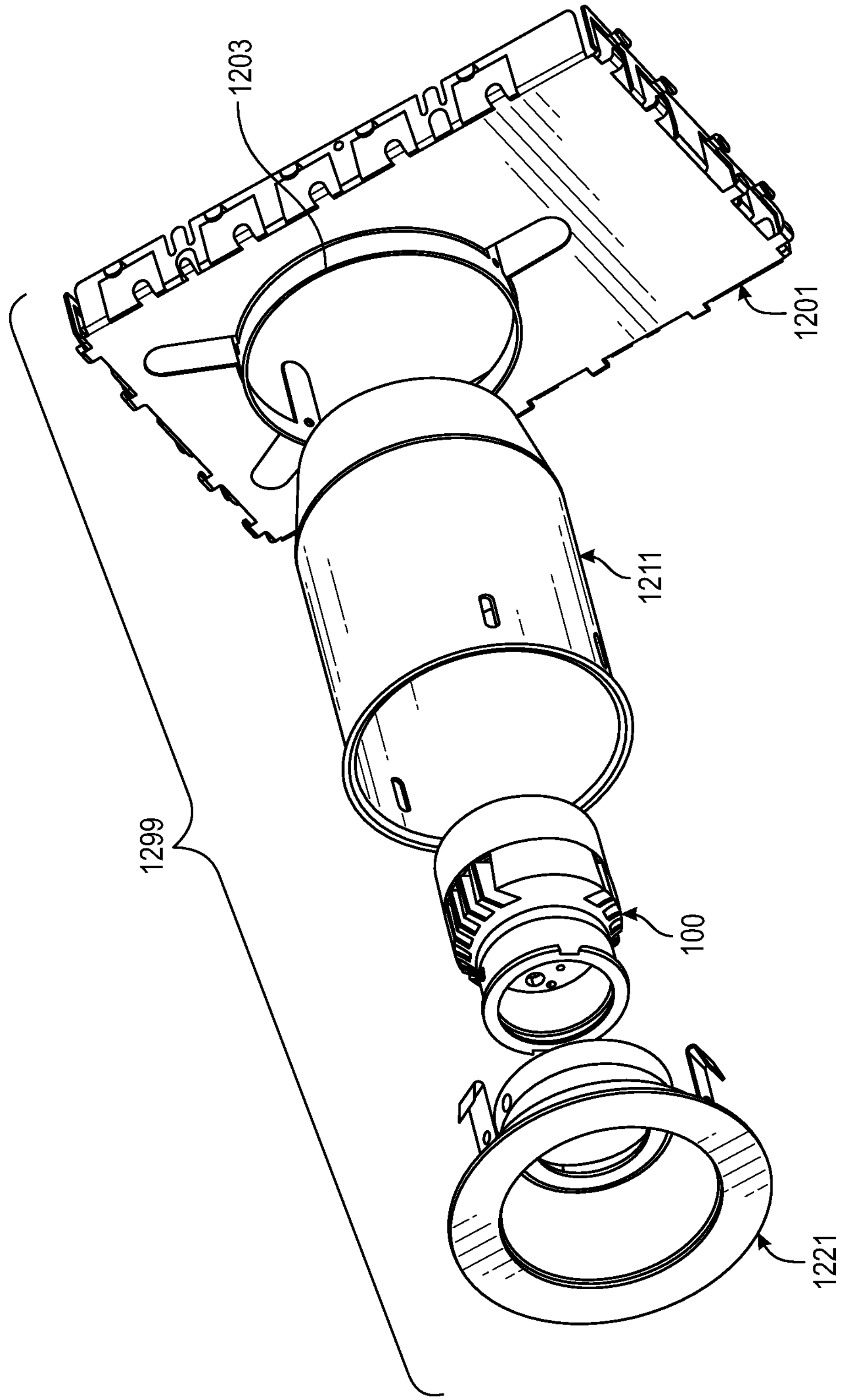
FIG. 12A illustrates an exploded bottom perspective view of the assembled integrated-lighting-module of FIG. 1 with respect to a frame, a can, and a trim.

FIG. 12A illustrates an exploded bottom perspective view of the assembled integrated-lighting-module 100 with respect to a frame 1201, a can 1211, and a trim 1221. FIG. 12A may depict an operational environment for the assembled integrated-lighting-module 100. In some embodiments, the assembled integrated-lighting-module 100 may be inserted into can 1211. In some embodiments, at least a portion of can 1211 may be fitted into a frame hole 1203, wherein the frame hole 1203 may be hole in frame 1201 for receiving at least a portion of can 1211. In some embodiments, the assembled integrated-lighting-module 100 (e.g., the twist-lock-teeth 133) may be attached (removably so in some embodiments) to trim 1221. Outer edges of the main flange of trim 1221 may cover over rough ceiling (or wall) holes. In some embodiments, trim 1221 may be of a fixed and predetermined size. In some embodiments, trim 1221 may be a "MR16" standard sized trim as that term may be used in the United States lighting industry. In some embodiments, trim 1221 may be other standard sizes. In some embodiments, FIG. 12A may show full assembly 1299 in an exploded state. In some embodiments, full assembly 1299 may comprise: frame 1201, can 1211, the assembled integrated-lighting-module 100, and trim 1221. In some embodiments, full assembly 1299 may be a lighting system.

Figure 12B:
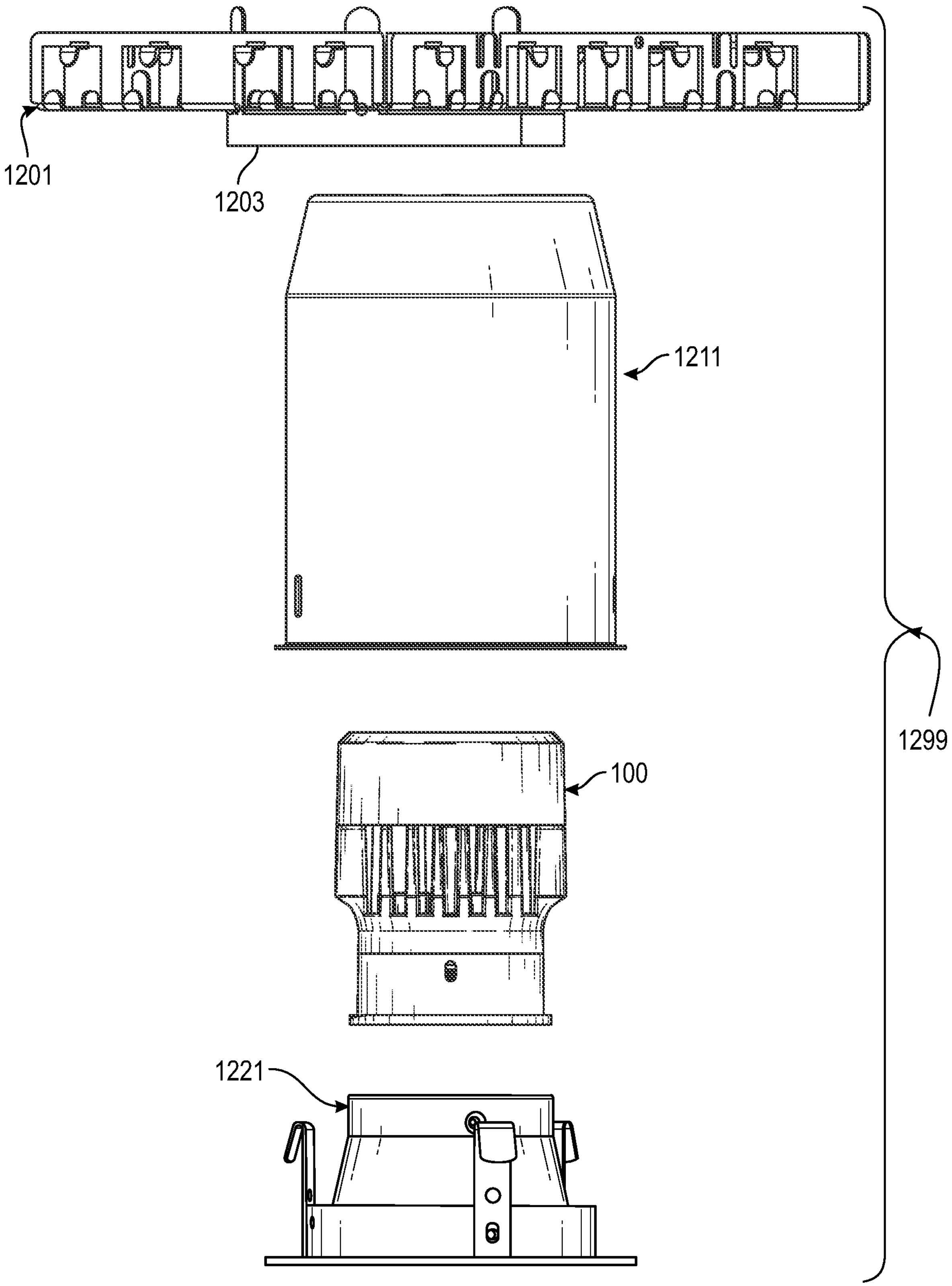
FIG. 12B illustrates an exploded side view (or rear view for view terminology of FIG. 3) of the assembled integrated-lighting-module of FIG. 1 with respect to the frame, the can, and the trim.

FIG. 12B illustrates an exploded side view (or rear view for view terminology of FIG. 3) of the assembled integrated-lighting-module 100 with respect to frame 1201, can 1211, and trim 1221. In some embodiments, FIG. 12B may show full assembly 1299 in an exploded state. As noted, in some embodiments, full assembly 1299 may comprise: frame 1201, can 1211, the assembled integrated-lighting-module 100, and trim 1221.

In some embodiments, a system for lighting may comprise at least one integrated-lighting-module 100 (e.g., assembled), and one or more of: at least one trim 1221, at least one can 1211, and/or at least one frame 1201.

In some embodiments, the invention may be characterized as a system for lighting. In some embodiments, the system may comprise integrated-lighting-module 100 and trim 1221. In some embodiments, trim 1221 may be sized as "MR16" which is a standard size of trim in the United States lighting industry. In some embodiments, trim 1221 may be other fixed and predetermined sizes. In some embodiments, the system may further comprise can 1211, wherein integrated-lighting-module 100 is received substantially within can 1211. In some embodiments, the system may further comprise frame 1201, wherein frame 1201 is configured to hold can 1211; wherein can 1211 is configured to hold the integrated-lighting-module 100. See e.g., FIG. 12A or FIG. 12B.

Figure 13A:
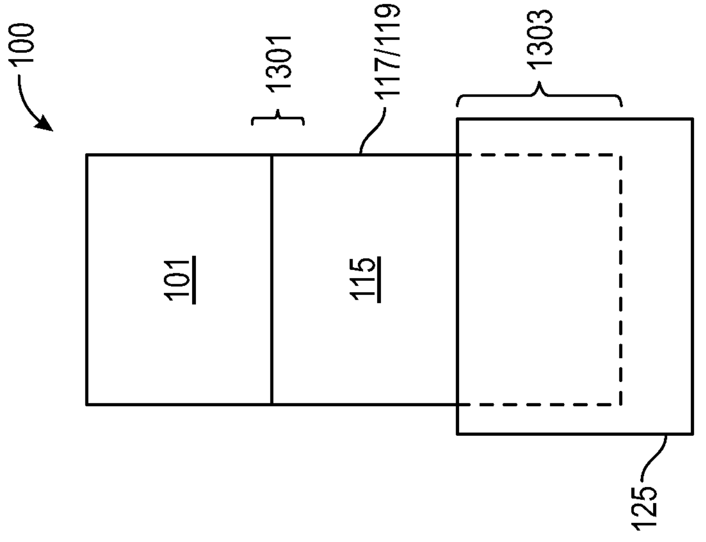
FIG. 13A may depict a schematic block diagram of a side view of an integrated-lighting-module with a focus on how a driver cap mates with (attaches to) a heat sink module; and how the heat sink module mates with (attaches to) a holder (optical reflector holder).
Figure 13B:
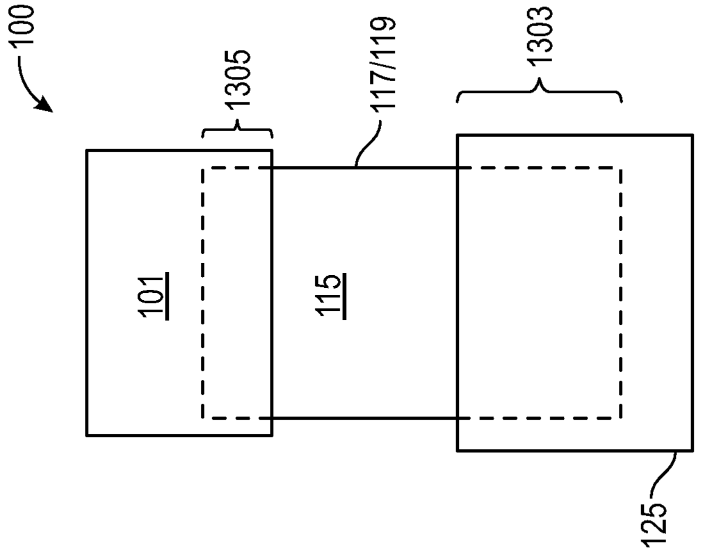
FIG. 13B may depict a schematic block diagram of a side view of an integrated-lighting-module with a focus on how a driver cap mates with (attaches to) a heat sink module; and how the heat sink module mates with (attaches to) a holder (optical reflector holder).
Figure 13C:
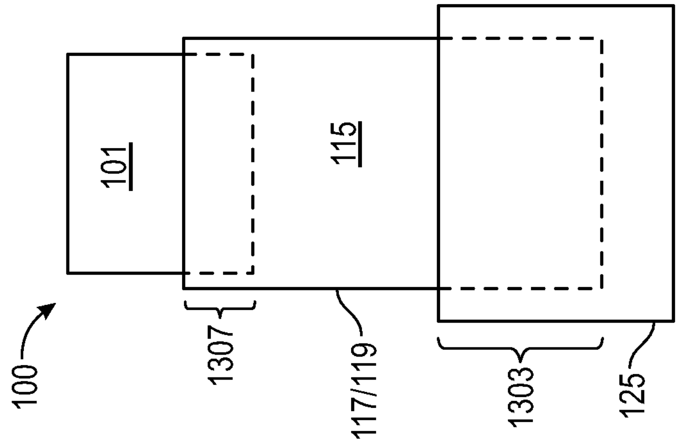
FIG. 13C may depict a schematic block diagram of a side view of an integrated-lighting-module with a focus on how a driver cap mates with (attaches to) a heat sink module; and how the heat sink module mates with (attaches to) a holder (optical reflector holder).
Figure 13F:
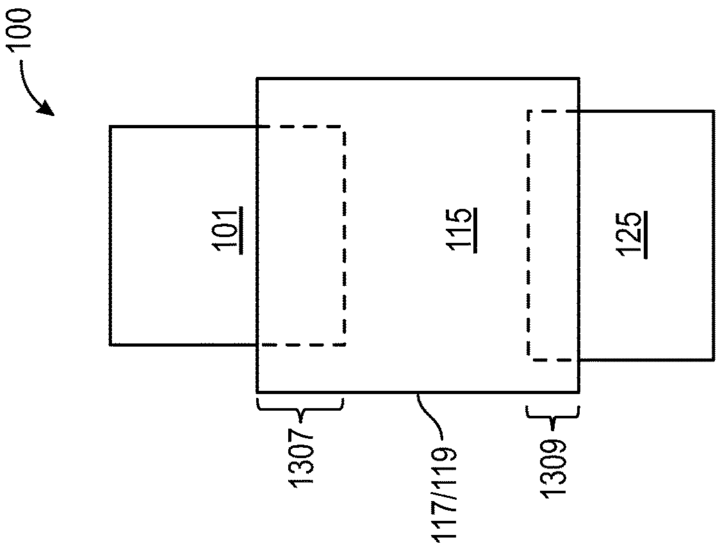
FIG. 13F may depict a schematic block diagram of a side view of an integrated-lighting-module with a focus on how a driver cap mates with (attaches to) a heat sink module; and how the heat sink module mates with (attaches to) a holder (optical reflector holder).
Figure 13E:
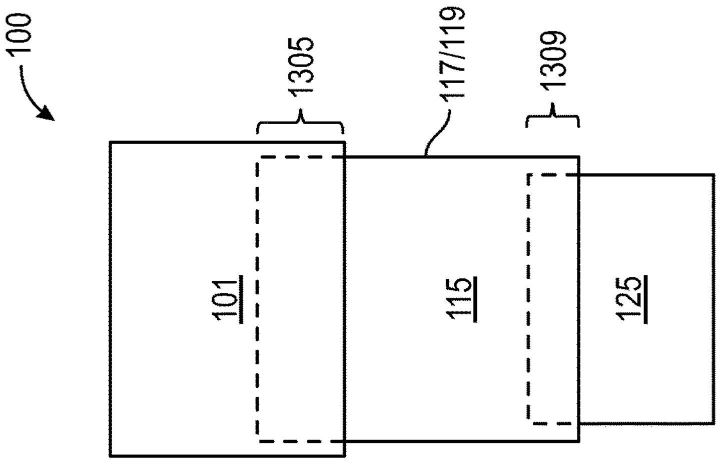
FIG. 13E may depict a schematic block diagram of a side view of an integrated-lighting-module with a focus on how a driver cap mates with (attaches to) a heat sink module; and how the heat sink module mates with (attaches to) a holder (optical reflector holder).
Figure 13D:
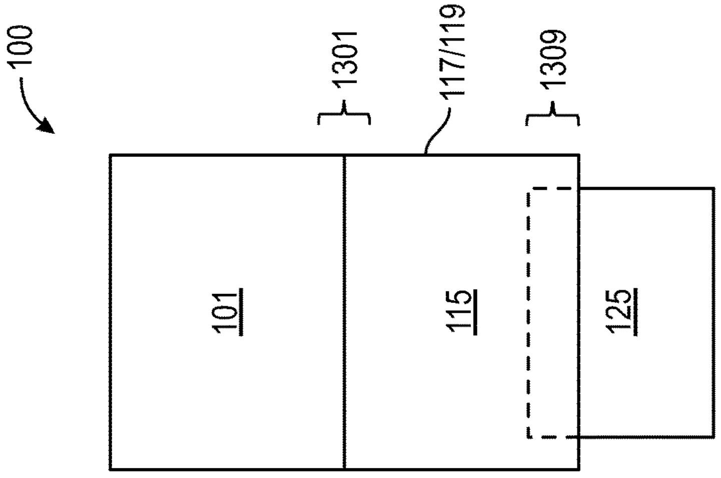
FIG. 13D may depict a schematic block diagram of a side view of an integrated-lighting-module with a focus on how a driver cap mates with (attaches to) a heat sink module; and how the heat sink module mates with (attaches to) a holder (optical reflector holder).
Figure 13G:
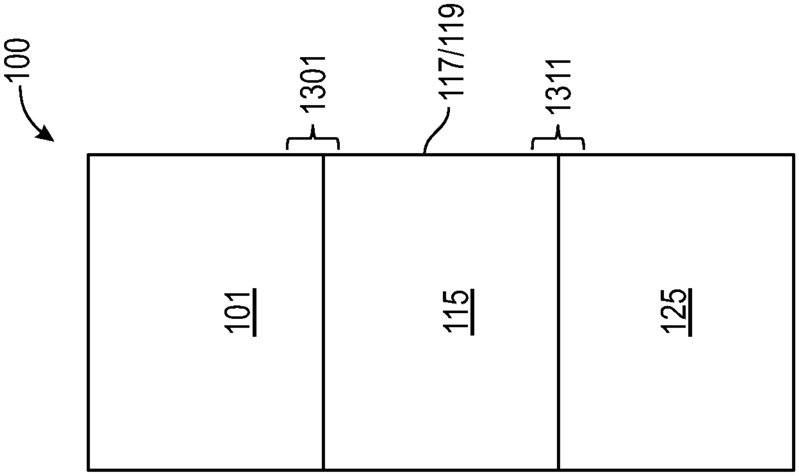
FIG. 13G may depict a schematic block diagram of a side view of an integrated-lighting-module with a focus on how a driver cap mates with (attaches to) a heat sink module; and how the heat sink module mates with (attaches to) a holder (optical reflector holder).
Figure 13H:
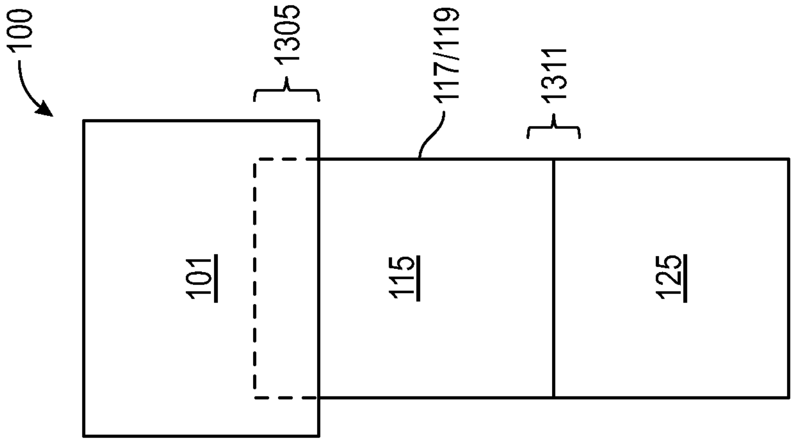
FIG. 13H may depict a schematic block diagram of a side view of an integrated-lighting-module with a focus on how a driver cap mates with (attaches to) a heat sink module; and how the heat sink module mates with (attaches to) a holder (optical reflector holder).
Figure 13I:
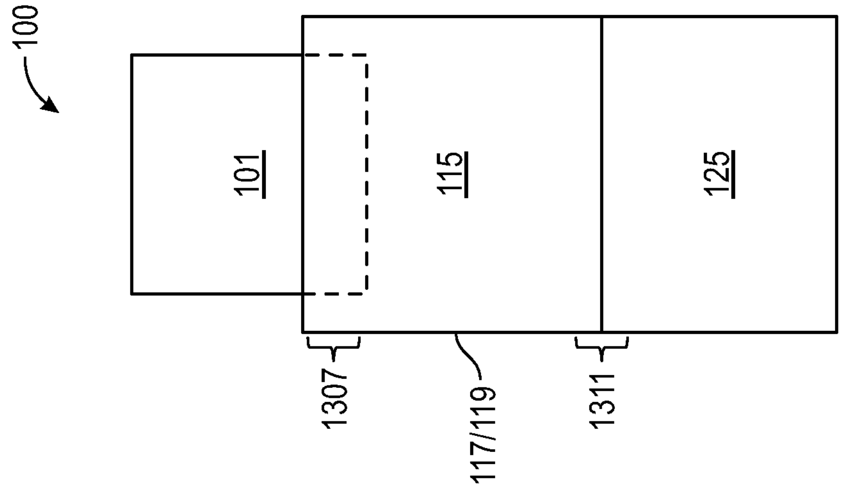
FIG. 13I may depict a schematic block diagram of a side view of an integrated-lighting-module with a focus on how a driver cap mates with (attaches to) a heat sink module; and how the heat sink module mates with (attaches to) a holder (optical reflector holder).

FIG. 13A through and including FIG. 13I may depict schematic block diagrams of side views of integrated-lighting-module 100 with a focus on how driver cap 101 mates with (attaches to) heat sink module 115; and how heat sink module 115 mates with (attaches to) holder 125. Because of this focus, some details of integrated-lighting-module 100 may be omitted in FIG. 13A through and including FIG. 13I, such as, but not limited to, heat sink module 115 fins and/or holder 125 external annular flange 131.

Note, broken lines (dashed lines) in FIG. 13A through FIG. 13I may indicate portions of a component/part that may reside within another/different component/part of a given (assembled) integrated-lighting-module 100 embodiment.

In some embodiments, an actual shape and/or a detailed shape of driver cap 101, heat sink module 115, and/or of holder 125 from FIG. 13A through and including FIG. 13I may be substantially as shown in FIG. 1 through and including FIG. 11.

Figure 16C:
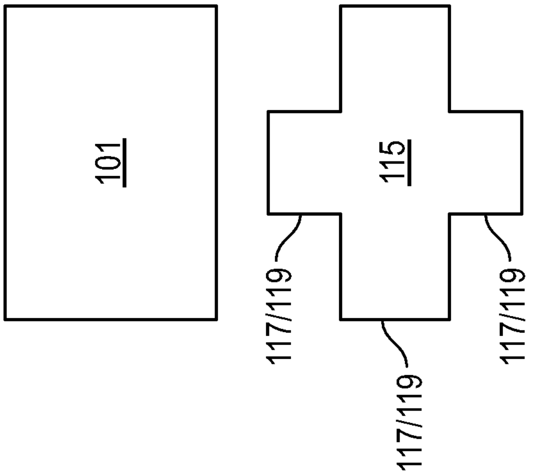
FIG. 16C may depict a schematic block diagram of a side view of a driver cap and of a heat sink module; wherein an overall shapes relationship between the given driver cap and its associated heat sink module is shown.
Figure 16B:
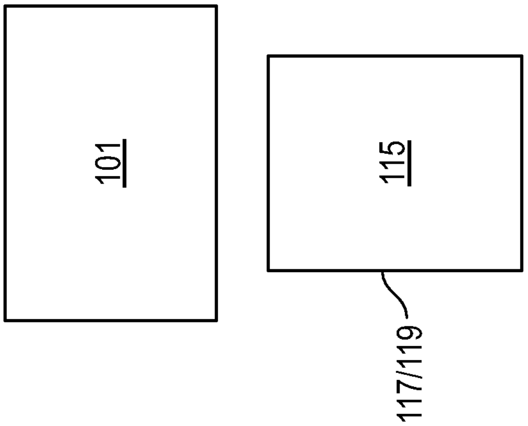
FIG. 16B may depict a schematic block diagram of a side view of a driver cap and of a heat sink module; wherein an overall shapes relationship between the given driver cap and its associated heat sink module is shown.
Figure 16A:
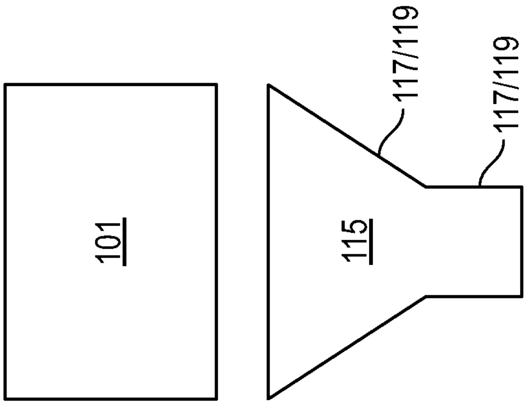
FIG. 16A may depict a schematic block diagram of a side view of a driver cap and of a heat sink module; wherein an overall shapes relationship between the given driver cap and its associated heat sink module is shown.

In some embodiments, an actual shape and/or a detailed shape of driver cap 101, heat sink module 115, and/or of holder 125 from FIG. 13A through and including FIG. 13I may be substantially as shown in FIG. 16A through and including FIG. 16C.

FIG. 13A may show an integrated-lighting-module 100 embodiment with both communication-region-between-driver-cap-and-heat-sink-module 1301 and communication-region-between-heat-sink-module-and-holder 1303. FIG. 13A may show communication-region-between-driver-cap-and-heat-sink-module 1301, which may be a region between driver cap 101 and that of heat sink module 115 where driver cap 101 and heat sink module 115 may be in (physical) communication with each other. In some embodiments, communication-region-between-driver-cap-and-heat-sink-module 1301 may be a region between driver cap 101 and that of heat sink module 115 where driver cap 101 and heat sink module 115 may be (physically) attached to each other. In some embodiments, communication-region-between-driver-cap-and-heat-sink-module 1301 may show that an outside diameter of a bottom region of driver cap 101 and an outside diameter of a top region of heat sink module 115 may be substantially similar (the same) with each other.

FIG. 13A may show communication-region-between-heat-sink-module-and-holder 1303, which may be a region between heat sink module 115 and that of holder 125 where heat sink module 115 and holder 125 may be in (physical) communication with each other. In some embodiments, communication-region-between-heat-sink-module-and-holder 1303 may be a region between heat sink module 115 and that of holder 125 where heat sink module 115 and holder 125 may be (physically) attached to each other. In some embodiments, communication-region-between-heat-sink-module-and-holder 1303 may show that an outside diameter of a bottom region of heat sink module 115 fits within an inside diameter of a top region of holder 125.

FIG. 13B may show an integrated-lighting-module 100 embodiment with both communication-region-between-driver-cap-and-heat-sink-module 1305 and communication-region-between-heat-sink-module-and-holder 1303. FIG. 13B may show communication-region-between-driver-cap-and-heat-sink-module 1305, which may be a region between driver cap 101 and that of heat sink module 115 where driver cap 101 and heat sink module 115 may be in (physical) communication with each other. In some embodiments, communication-region-between-driver-cap-and-heat-sink-module 1305 may be a region between driver cap 101 and that of heat sink module 115 where driver cap 101 and heat sink module 115 may be (physically) attached to each other. In some embodiments, communication-region-between-driver-cap-and-heat-sink-module 1305 may show that an outside diameter of a top region of heat sink module 115 fits within an inside diameter of a bottom region of driver cap 101. FIG. 13B may also show communication-region-between-heat-sink-module-and-holder 1303, which may be as shown and described in FIG. 13A.

FIG. 13C may show an integrated-lighting-module 100 embodiment with both communication-region-between-driver-cap-and-heat-sink-module 1307 and communication-region-between-heat-sink-module-and-holder 1303. FIG. 13C may show communication-region-between-driver-cap-and-heat-sink-module 1307, which may be a region between driver cap 101 and that of heat sink module 115 where driver cap 101 and heat sink module 115 may be in (physical) communication with each other. In some embodiments, communication-region-between-driver-cap-and-heat-sink-module 1307 may be a region between driver cap 101 and that of heat sink module 115 where driver cap 101 and heat sink module 115 may be (physically) attached to each other. In some embodiments, communication-region-between-driver-cap-and-heat-sink-module 1307 may show that an outside diameter of a bottom region of driver cap 101 fits within an inside diameter of a top region of heat sink module 115. FIG. 13C may also show communication-region-between-heat-sink-module-and-holder 1303, which may be as shown and described in FIG. 13A.

FIG. 13D may show an integrated-lighting-module 100 embodiment with both communication-region-between-driver-cap-and-heat-sink-module 1301 and communication-region-between-heat-sink-module-and-holder 1309. FIG. 13D may show communication-region-between-heat-sink-module-and-holder 1309, which may be a region between heat sink module 115 and that of holder 125 where heat sink module 115 and holder 125 may be in (physical) communication with each other. In some embodiments, communication-region-between-heat-sink-module-and-holder 1309 may be a region between heat sink module 115 and that of holder 125 where heat sink module 115 and holder 125 may be (physically) attached to each other. In some embodiments, communication-region-between-heat-sink-module-and-holder 1309 may show that an outside diameter of a top region of holder 125 fits within an inside diameter of a bottom region of heat sink module 115. FIG. 13D may also show communication-region-between-driver-cap-and-heat-sink-module 1301, which may be as shown and described in FIG. 13A.

FIG. 13E may show an integrated-lighting-module 100 embodiment with both communication-region-between-driver-cap-and-heat-sink-module 1305 (e.g., as shown and discussed for FIG. 13B) and with communication-region-between-heat-sink-module-and-holder 1309 (e.g., as shown and discussed for FIG. 13D).

FIG. 13F may show an integrated-lighting-module 100 embodiment with both communication-region-between-driver-cap-and-heat-sink-module 1307 (e.g., as shown and discussed for FIG. 13C) and with communication-region-between-heat-sink-module-and-holder 1309 (e.g., as shown and discussed for FIG. 13D).

FIG. 13G may show an integrated-lighting-module 100 embodiment with both communication-region-between-driver-cap-and-heat-sink-module 1301 and communication-region-between-heat-sink-module-and-holder 1311. FIG. 13G may show communication-region-between-heat-sink-module-and-holder 1311, which may be a region between heat sink module 115 and that of holder 125 where heat sink module 115 and heat sink module 115 may be in (physical) communication with each other. In some embodiments, communication-region-between-heat-sink-module-and-holder 1311 may be a region between heat sink module 115 and that of holder 125 where heat sink module 115 and holder 125 may be (physically) attached to each other. In some embodiments, communication-region-between-heat-sink-module-and-holder 1311 may show that an outside diameter of a bottom region of heat sink module 115 and an outside diameter of a top region of holder 125 may be substantially similar (the same) with each other. FIG. 13G may also show communication-region-between-driver-cap-and-heat-sink-module 1301, which may be as shown and described in FIG. 13A.

FIG. 13H may show an integrated-lighting-module 100 embodiment with both communication-region-between-driver-cap-and-heat-sink-module 1305 (e.g., as shown and discussed for FIG. 13B) and with communication-region-between-heat-sink-module-and-holder 1311 (e.g., as shown and discussed for FIG. 13G).

FIG. 13I may show an integrated-lighting-module 100 embodiment with both communication-region-between-driver-cap-and-heat-sink-module 1307 (e.g., as shown and discussed for FIG. 13C) and with communication-region-between-heat-sink-module-and-holder 1311 (e.g., as shown and discussed for FIG. 13G).

In some embodiments, a largest outside diameter of a given integrated-lighting-module 100, may be from a portion/region of one or more of: driver cap 101, heat sink module 115, and/or holder 125. See e.g., FIG. 13A through and including FIG. 13I.

In some embodiments, a smallest outside diameter of a given integrated-lighting-module 100, may be from a portion/region of one or more of: driver cap 101, heat sink module 115, and/or holder 125. See e.g., FIG. 13A through and including FIG. 13I.

In some embodiments, in communication-region-between-heat-sink-module-and-holder 1303, at least some portion of the bottom region of heat sink module 115 may have outside threading 1123; and at least some portion of the top region of holder 125 may have inside threading 1143. In some embodiments, threadings 1123 and 1143 may be complimentary and/or removably attach to each other. See e.g., FIG. 13A to FIG. 13C, FIG. 11, and FIG. 15.

In some embodiments, in communication-region-between-driver-cap-and-heat-sink-module 1305, at least some portion of the top region of heat sink module 115 may have outside threading; and at least some portion of the bottom region of driver cap 101 may have inside threading. In some embodiments, these threadings may be complimentary and/or removably attach to each other. See e.g., FIG. 13B, FIG. 13E, and/or FIG. 13H.

In some embodiments, in communication-region-between-driver-cap-and-heat-sink-module 1307, at least some portion of the bottom region of driver cap 101 may have outside threading; and at least some portion of the top region of heat sink module 115 may have inside threading. In some embodiments, these two threadings may be complimentary and/or removably attach to each other. See e.g., FIG. 13C, FIG. 13F, and/or FIG. 13I.

In some embodiments, in communication-region-between-heat-sink-module-and-holder 1309, at least some portion of the top region of holder 125 may have outside threading; and at least some portion of the bottom region of heat sink module 115 may have inside threading. In some embodiments, these threadings may be complimentary and/or removably attach to each other. See e.g., FIG. 13D to FIG. 13F.

In some embodiments, the outside diameters and/or the inside diameters of regions 1301 to 1311 may be selected from a range of one-half (0.5) inch to two and a half (2.5) inches. In some embodiments, the outside diameters and/or the inside diameters of regions 1301 to 1311 may be selected from a range of one and one quarter (1.25) inch to one and three quarter (1.75) inches. In some embodiments, the outside diameters and/or the inside diameters of regions 1301 to 1311 may be selected from a range of one and one-half (1.50) inches to two and one-quarter (2.25) inches. In some embodiments, a given diameter itself may be finite and fixed (non-variable).

In some embodiments, the physical communication and/or the attachment between a bottom region of driver cap 101 and a top region of heat sink module 115 may be selected from one or more of: a mating threaded connection; a snap fit; a press fit; an interference fit; a friction fit; a tongue and groove connection; an alternating tab/tooth-and-gap connection; a mechanical fastener; a clip; a screw; a bolt; a rivet; a nail; a tack; a staple; a brad; a pin; a rod; a linkage; a chain; a hinge; a weld; a heat weld; a tack weld; an ultrasonic weld; a solvent bond; adhesive; glue; epoxy; Velcro (or Velcro like); tape; portions thereof; combinations thereof; and/or the like.

In some embodiments, the physical communication and/or the attachment between a bottom region of heat sink module 115 and a top region of holder 125 may be selected from one or more of: a mating threaded connection; a snap fit; a press fit; an interference fit; a friction fit; a tongue and groove connection; an alternating tab/tooth-and-gap connection; a mechanical fastener; a clip; a screw; a nail; a tack; a staple; a brad; a pin; a rod; a weld; a heat weld; a tack weld; an ultrasonic weld; a solvent bond; adhesive; glue; epoxy; Velcro (or Velcro like); portions thereof; combinations thereof; and/or the like.

In some embodiments, the regions of communications between components/parts associated with reference numerals 1301, 1303, 1305, 1307, 1309, and/or 1311 may be selected from one or more of: a mating threaded connection; a snap fit; a press fit; an interference fit; a friction fit; a tongue and groove connection; an alternating tab/tooth-and-gap connection; a mechanical fastener; a clip; a screw; a nail; a tack; a staple; a brad; a pin; a rod; a weld; a heat weld; a tack weld; an ultrasonic weld; a solvent bond; adhesive; glue; epoxy; Velcro (or Velcro like); portions thereof; combinations thereof; and/or the like.

Figure 14C:
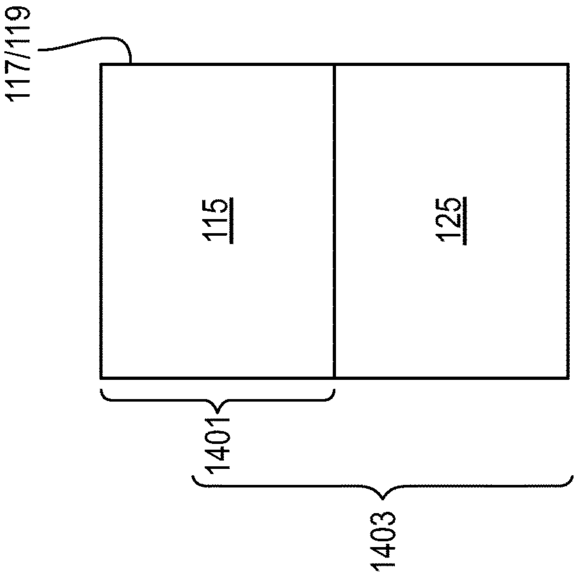
FIG. 14C may depict a schematic block diagram of a side view of a heat sink module and a holder (when assembled to each other), with a focus on where a LED light chip and/or an optical reflector may reside therein.
Figure 14B:
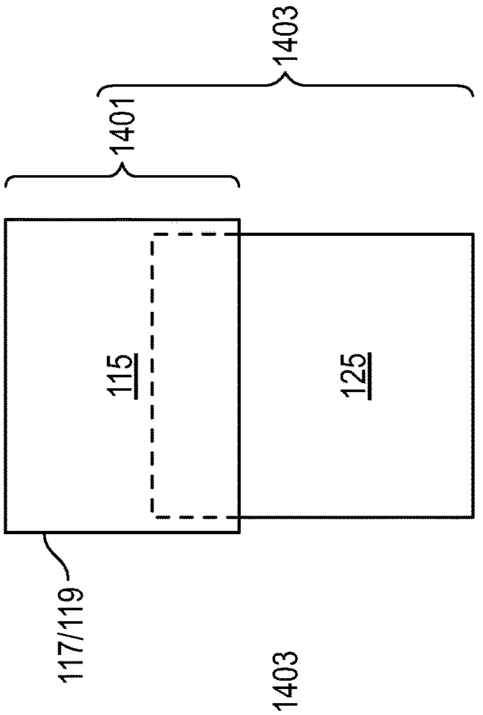
FIG. 14B may depict a schematic block diagram of a side view of a heat sink module and a holder (when assembled to each other), with a focus on where a LED light chip and/or an optical reflector may reside therein.
Figure 14A:
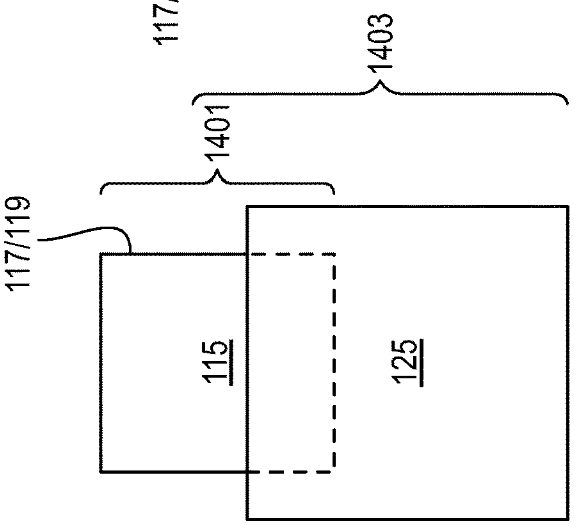
FIG. 14A may depict a schematic block diagram of a side view of a heat sink module and a holder (when assembled to each other), with a focus on where a LED light chip and/or an optical reflector may reside therein.

FIG. 14A through and including FIG. 14C may depict schematic block diagrams of side views of heat sink module 115 and holder 125 (when assembled to each other), with a focus on where LED light chip 701 and/or optical reflector 703 may reside therein. In some embodiments, reference numeral 1401 may be a region-for-housing LED light chip 701. In some embodiments, reference numeral 1403 may be a region-for-housing optical reflector 703. In some embodiments, region-for-housing-LED-chip 1401 may be entirely within heat sink module 115. In some embodiments, region-for-housing-LED-chip 1401 may be at least mostly below (underneath) fin(s) 117 and surrounded by sides of heat sink module 115. In some embodiments, a bottom portion of heat sink module 115 may extend into a top portion of holder 125 (see e.g., FIG. 14A and/or communication-region-between-heat-sink-module-and-holder 1303 in FIG. 13A). In some embodiments, a top portion of holder 125 may extend into a bottom portion of heat sink module 115 (see e.g., FIG. 14B and/or communication-region-between-heat-sink-module-and-holder 1309 in FIG. 13D). In some embodiments, a bottom portion of heat sink module 115 may butt up against a top portion of holder 125 (see e.g., FIG. 14C and/or communication-region-between-heat-sink-module-and-holder 1311 in FIG. 13G). In some embodiments, a bottom portion of heat sink module 115 may have an outside diameter that may be about the same as the outside diameter of a top portion of holder 125 (see e.g., FIG. 14C and/or communication-region-between-heat-sink-module-and-holder 1311 in FIG. 13G). In some embodiments, region-for-housing-reflector 1403 may be entirely within holder 125. In some embodiments, region-for-housing-reflector 1403 may be within holder 125 and within heat sink module 115. In some embodiments, region-for-housing-reflector 1403 may be mostly within holder 125 and partially within heat sink module 115. In some embodiments, region-for-housing-LED-chip 1401 may be located above region-for-housing-reflector 1403. In some embodiments, region-for-housing-reflector 1403 may be located below region-for-housing-LED-chip 1401. See e.g., FIG. 14A to FIG. 14C.

In some embodiments, when integrated-lighting-module 100 may be in its assembled configuration, LED light chip 701 (from its top or its bottom) may be located closer to a top of heat sink module 115 than to a bottom of holder 125. See e.g., FIG. 14A to FIG. 14C.

In some embodiments, when integrated-lighting-module 100 may be in its assembled configuration, a top of optical reflector 703 may be located closer to a top of heat sink module 115 than to a bottom of holder 125. See e.g., FIG. 14A to FIG. 14C.

Figure 15:
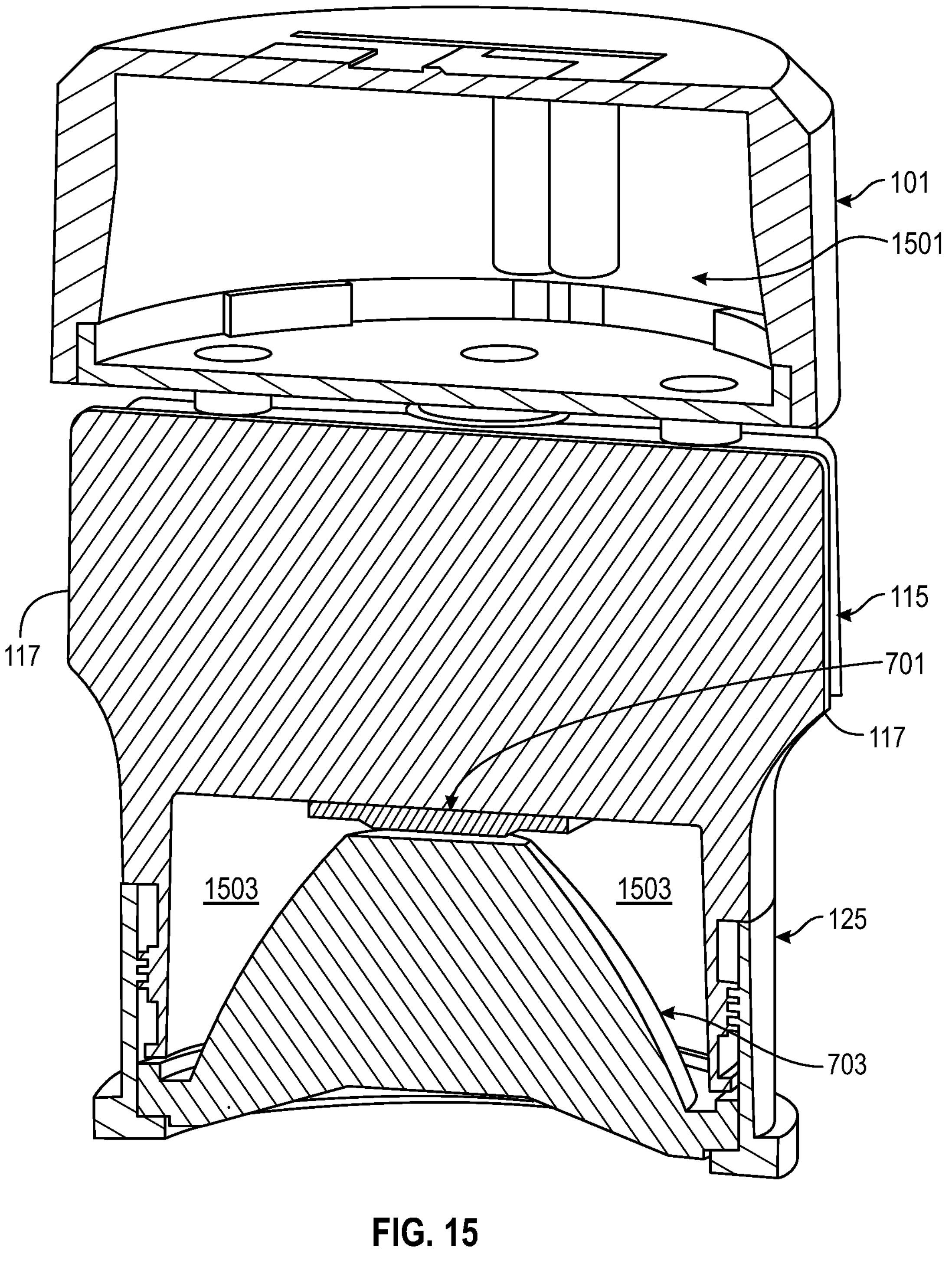
FIG. 15 may be a lengthwise (top to bottom) cross-sectional diagram through a given integrated-lighting-module.

FIG. 15 may be a lengthwise (top to bottom) cross-sectional diagram through a given integrated-lighting-module 100. In some embodiments, a plane of this cross-section of FIG. 15 may be substantially parallel with a major/main plane of a fin 117 of heat sink module 115. In some embodiments, volume 1501 may be a volume within/inside of driver cap 101. In some embodiments, volume 1501 may be configured to house and/or receive at least one (electronic) driver. For these reasons, in some embodiments, volume 1501 may be referred to a driver-volume 1501. In some embodiments, volume 1503 may be volume within/inside of a bottom region of heat sink module 115 and within/inside a top region of holder 125. In some embodiments, volume 1503 may be bounded on its top by heat sink module 115 (such as, but not limited to, fin(s) 117). In some embodiments, volume 1503 may be bounded on its sides by sides of heat sink module 115 and/or by sides of holder 125. In some embodiments, volume 1503 may be at least mostly open on its bottom (e.g., to provide for light emission/escape). In some embodiments, volume 1503 may be configured to house and/or receive at least one LED light chip 701 and/or at least one optical reflector 703. In some embodiments, volume 1503 may provide region-for-housing-LED-chip 1401 and region-for-housing-reflector 1403. In some embodiments, prior to attaching holder 125 to heat sink module 115, LED light chip 701 may be attached to a bottom interior of heat sink module 115 within volume 1503; and then optical reflector 703 may be added to (inserted) into volume 1503, below LED light chip 701; and then lastly holder 125 may be attached to heat sink module 115.

In some embodiments, (at least one) LED light chip 701 may be radially surrounded by portions of heat sink module 115. In some embodiments, (at least one) LED light chip 701 may be attached to heat sink module 115. In some embodiments, (at least one) LED light chip 701 may be attached a bottom portion of heat sink module 115. In some embodiments, (at least one) LED light chip 701 may be attached a central portion of heat sink module 115. In some embodiments, (at least one) LED light chip 701 may be attached a bottom central portion of heat sink module 115. See e.g., FIG. 15 and FIG. 11.

In some embodiments, when integrated-lighting-module 100 may be in its assembled configuration, LED light chip 701 (from its top or its bottom) may be located closer to a bottom of holder 125 than to a top of heat sink module 115. See e.g., FIG. 15.

In some embodiments, when integrated-lighting-module 100 may be in its assembled configuration, a top of optical reflector 703 may be located closer to a bottom of holder 125 than to a top of heat sink module 115. See e.g., FIG. 15.

FIG. 16A through and including FIG. 16C may depict schematic block diagrams of side views of driver caps 101 and of heat sink modules 115, with each such figure showing a single driver cap 101 paired with a single heat sink module 115; wherein these figures on showing an overall shapes relationship between a given driver cap 101 and its heat sink module 115. Because of this focus, some details of driver cap 101 and/or of heat sink module 115 may be omitted in FIG. 16A through and including FIG. 16C, such as, but not limited to, heat sink module 115 fins. Note, FIG. 16A through and including FIG. 16C also show the given driver cap 101 and its associated heat sink module 115 dissembled from each other; however, during intended use the given driver cap 101 and its associated heat sink module 115 would be attached to each other (e.g., as shown in FIG. 1, FIG. 13A to FIG. 13I, FIG. 12, and/or FIG. 15).

Discussing FIG. 16A, in some embodiments, an outside diameter of side-walls 103 of driver cap 101 may be substantially (mostly) similar (or the same) as an outside diameter of a top (upper) region of heat sink module 115 (see also region 1301 of FIG. 13A for this same/similar outside diameter configuration between driver cap 101 and heat sink module 115). In some embodiments, the outside diameter of heat sink module 115 may become smaller from the top of 115 to the bottom of 115. In some embodiments, a bottom portion of heat sink module 115 may have a smaller outside diameter than a top (upper) region of heat sink module 115 has. In some embodiments, a bottom portion of heat sink module 115 may have uniform and non-variable outside diameter (e.g., with a right cylinder shape) that may be smaller than the outside diameter of a top (upper) region of heat sink module 115. In some embodiments, heat sink module 115 may have a general shape (e.g., not necessarily including shapes of fin(s) 117) that may be at least substantially similar to a funnel and/or a conical frustum. In some embodiments, an upper portion of heat sink module 115 may have a general shape (e.g., not necessarily including shapes of fin(s) 117) that may be at least substantially similar to a funnel and/or a conical frustum; and a bottom portion of heat sink module 115 may have shape that may be at least substantially similar to a right cylinder; and the upper portion of heat sink module 115 may be attached to the bottom portion of heat sink module 115. In some embodiments, the upper portion of heat sink module 115 and the bottom portion of heat sink module 115 may be different portions of a single/same article of manufacture. In some embodiments, a transition from a largest outside diameter of heat sink module 115 to a smallest outside diameter of heat sink module 115 may be smooth, gradual, and/or linear. See e.g., FIG. 16A. (In some embodiments, a bottom of heat sink module 115 may be at least mostly open, to provide some access to volume 1503, see e.g., FIG. 15.)

Discussing FIG. 16B, in some embodiments, an outside diameter of side-walls 103 of driver cap 101 may be larger than an outside diameter of heat sink module 115 (see also region 1305 of FIG. 13B for this same/similar outside diameter configuration between driver cap 101 and heat sink module 115). In some embodiments, a transition from a larger outside diameter of driver cap 101 to a smaller outside diameter of heat sink module 115 may be abrupt as in a step from one outside diameter to another. In some embodiments, an outside diameter of heat sink module 115 may be uniform and non-variable along an overall length (height) of heat sink module 115. In some embodiments, heat sink module 115 may have a general shape (e.g., not necessarily including shapes of fin(s) 117) that may be at least substantially similar to a right cylinder. See e.g., FIG. 16B.

Discussing FIG. 16C, in some embodiments, an outside diameter of side-walls 103 of driver cap 101 may be substantially (mostly) similar (or the same) as an outside diameter of a portion of heat sink module 115 that is not closest to driver cap 101. In some embodiments, a portion of heat sink module 115 that may be closest to driver cap 101 may have an outside diameter that is smaller than the outside diameter of driver cap 101. In some embodiments, a top (upper) portion of heat sink module 115 that may be closest to driver cap 101 may have an outside diameter that is smaller than the outside diameter of driver cap 101. In some embodiments, a portion of heat sink module 115 that may be furthest from driver cap 101 may have an outside diameter that is smaller than the outside diameter of driver cap 101. In some embodiments, a bottom portion of heat sink module 115 that may be furthest from driver cap 101 may have an outside diameter that is smaller than the outside diameter of driver cap 101. In some embodiments, a middle portion of heat sink module 115 (with respect to a length/height of heat sink module 115) may have an outside diameter that is at least substantially (mostly) the same as the outside diameter of driver cap 101. In some embodiments, the top (upper) portion, the middle portion, and the bottom portion of heat sink module 115 may be all of a single integral article of manufacture. In some embodiments, a transition from a largest outside diameter of heat sink module 115 to a smallest (or smaller) outside diameter of heat sink module 115 may be abrupt as in a step from one outside diameter to another. See e.g., FIG. 16C.

Note, FIG. 17A through FIG. 17H show various shapes of heat sink modules 115, wherein these heat sink module shapes shown in FIG. 17A to FIG. 17H may be pre-existing, i.e., prior art. However, attachment and/or use of these heat sink module shapes with driver 101, holder 125, LED light chip 701, optical reflector 703, and/or a trim may be novel and non-obvious.

Figure 17A:
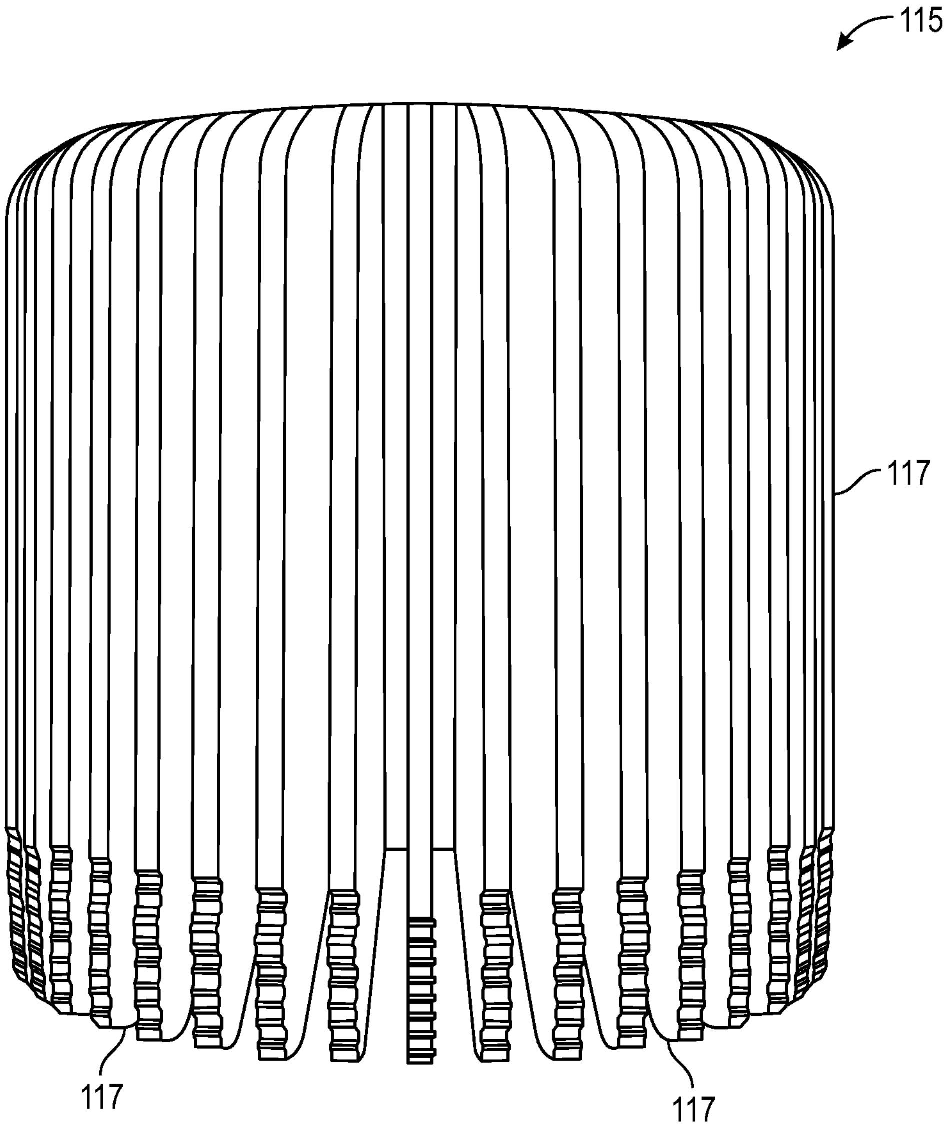
FIG. 17A (Prior Art)
FIG. 17A (prior art) shows a general side view of a heat sink module that may be substantially cylindrical in its outer shape/appearance.

FIG. 17A shows a general side view of a heat sink module 115 that may be substantially cylindrical in its outer shape/appearance. In some embodiments, substantially cylindrical heat sink module 115 may have a fixed, finite, and/or common/same outer diameter all along a length/height of substantially cylindrical heat sink module 115. In some embodiments, a top portion/region of substantially cylindrical heat sink module 115 may be configured for attachment to driver cap 101. In some embodiments, a bottom portion/region of substantially cylindrical heat sink module 115 may be configured for attachment to holder 125. In some embodiments, this substantially cylindrical heat sink module 115 may have a plurality of fins 117. In some embodiments, the plurality of fins 117 may extend radially outwards away from a common longitudinal center/axis of substantially cylindrical heat sink module 115. In some embodiments, plurality of fins 117 may run from a bottom to a top of substantially cylindrical heat sink module 115. In some embodiments, at least a portion of plurality of fins 117 may be threaded for attachment to driver cap 101. In some embodiments, at least a portion of an exterior portion of plurality of fins 117 may be threaded for attachment to holder 125. In some embodiments, a bottom interior of substantially cylindrical heat sink module 115 may be at least mostly hollow and configured for receiving LED light chip 701 and/or optical reflector 703.

Figure 17B:
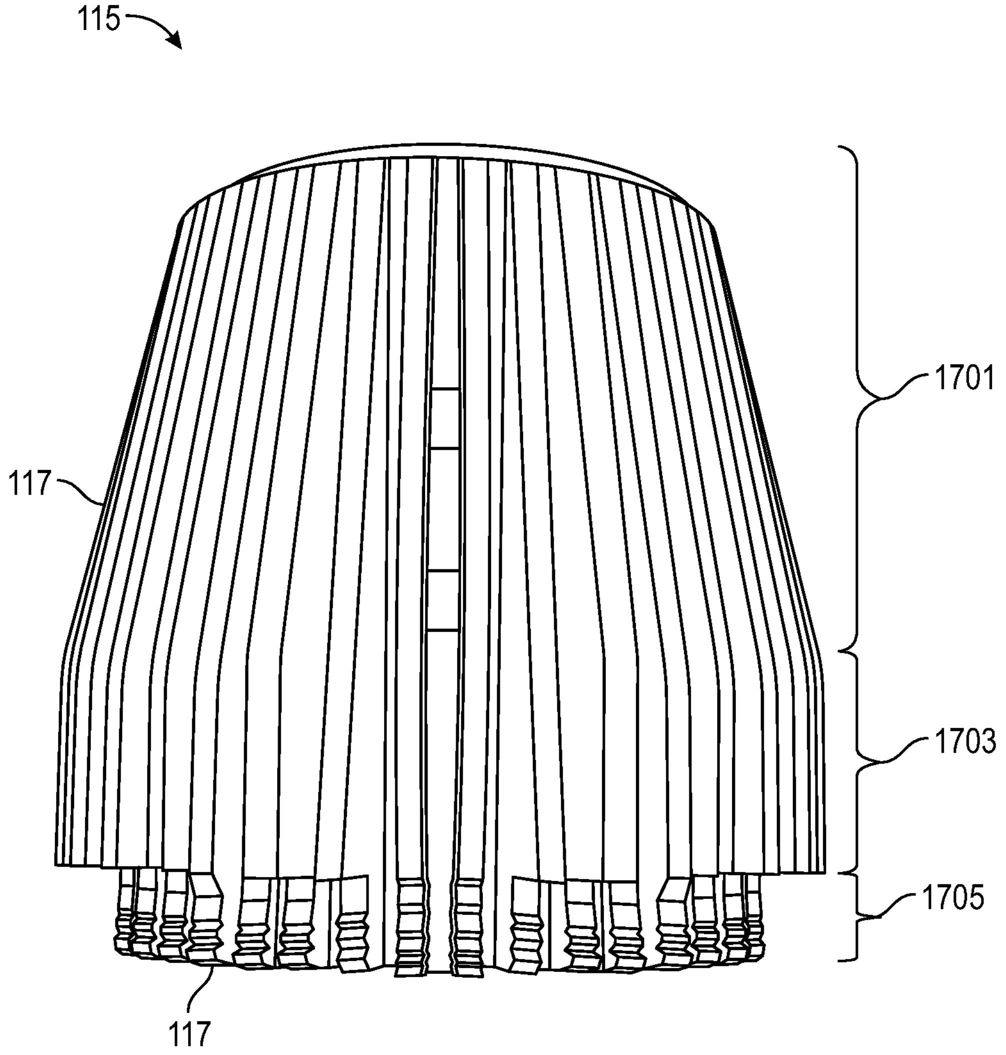
FIG. 17B (Prior Art)
FIG. 17B (prior art) shows a general side view of a heat sink module that may have a particular outer shape/appearance.

FIG. 17B shows a general side view of a heat sink module 115 that may have a particular outer shape/appearance. In some embodiments, the outer shape/appearance of heat sink module 115 may comprise three distinct regions, each of its own particular geometry, upper-region 1701, middle-region 1703, and bottom-region 1705. In some embodiments, upper-region 1701 may have an outer shape/appearance that may be substantially shaped as a conical frustrum. In some embodiments, middle-region 1703 may have an outer shape/appearance that may be substantially shaped as a right cylinder. In some embodiments, bottom-region 1705 may have an outer shape/appearance that may be substantially shaped as a conical frustrum and/or substantially shaped as a right cylinder. In some embodiments, middle-region 1703 may be disposed between upper-region 1701 and bottom-region 1705. In some embodiments, a top of middle-region 1703 may be attached/connected to a bottom of upper-region 1701. In some embodiments, a bottom of middle-region 1703 may be attached/connected to a top of bottom-region 1705. In some embodiments, upper-region 1701, middle-region 1703, and bottom-region 1705 may be integral with each other, i.e., as a single article of manufacture. In some embodiments, a widest outside diameter of heat sink module 115 may be at a bottom of upper-region 1701 and/or at middle-region 1703. In some embodiments, a smallest outside diameter of heat sink module 115 may be at a top of upper-region 1701. In some embodiments, an outside diameter of bottom-region 1705 may be less than an outside diameter of middle-region 1703. In some embodiments, a widest diameter of upper-region 1701 may be located closer to a bottom of heat sink module 115; whereas, a narrowest diameter of upper-region 1701 may be located closer to a top of heat sink module 115 (note, this may be an opposite orientation as compared to heat sink module 115 of FIG. 17D). Continuing discussing FIG. 17B, in some embodiments, with respect to an overall length/height of heat sink module 115, bottom-region 1705 may be shortest and upper-region 1701 may be longest. In some embodiments, with respect to the overall length/height of heat sink module 115, middle-region 1703 may be longer than bottom-region 1705 but shorter than upper-region 1701. In some embodiments, a transition from middle-region 1703 to bottom-region 1705 may be as a step, i.e., abrupt. In some embodiments, a transition from the larger outer diameter of middle-region 1703 to the smaller outer diameter of bottom-region 1705 may be as a step, i.e., abrupt. In some embodiments, heat sink module 115 may comprise a plurality of fins 117. In some embodiments, upper-region 1701, middle-region 1703, and/or bottom-region 1705 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of heat sink module 115. In some embodiments, at least a portion of plurality of fins 117 may be threaded for attachment to driver cap 101. In some embodiments, at least a portion of an exterior portion of plurality of fins 117 may be threaded for attachment to holder 125. In some embodiments, at least a portion of an exterior portion of plurality of fins 117 of bottom-region 1705 may be threaded for attachment to holder 125. In some embodiments, a bottom interior of heat sink module 115 may be at least mostly hollow and configured for receiving LED light chip 701 and/or optical reflector 703.

Figure 17C:
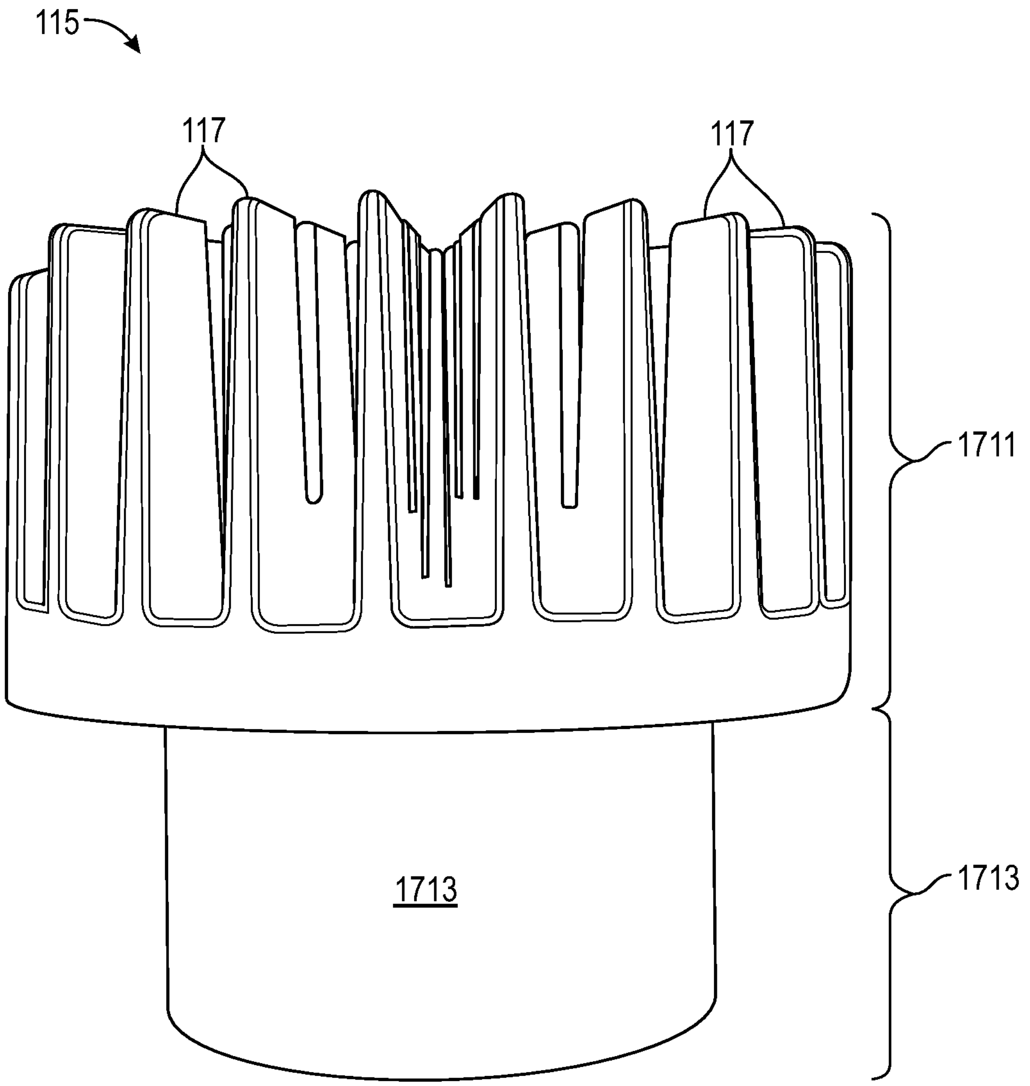
FIG. 17C (Prior Art)
FIG. 17C (prior art) shows a general side view of a heat sink module that may have a particular outer shape/appearance.

FIG. 17C shows a general side view of a heat sink module 115 that may have a particular outer shape/appearance. In some embodiments, the outer shape/appearance of heat sink module 115 may comprise two distinct regions, each of its own particular geometry, upper-region 1711 and lower-region 1713. In some embodiments, upper-region 1711 may have an outer shape/appearance that may be substantially shaped as a right cylinder. In some embodiments, lower-region 1713 may have an outer shape/appearance that may be substantially shaped as another/different right cylinder. In some embodiments, a top of lower-region 1713 may be attached/connected to a bottom of upper-region 1711. In some embodiments, upper-region 1711 and lower-region 1713 may be integral with each other, i.e., as a single article of manufacture. In some embodiments, a widest outside diameter of heat sink module 115 may be at upper-region 1711. In some embodiments, a smallest outside diameter of heat sink module 115 may be at lower-region 1713. In some embodiments, an outside diameter of upper-region 1711 may be larger than an outside diameter of lower-region 1713. In some embodiments, with respect to an overall length/height of heat sink module 115, upper-region 1711 and lower-region 1713 may have similar heights as each other. In some embodiments, a transition from upper-region 1711 to lower-region 1713 may be as a step, i.e., abrupt. In some embodiments, a transition from the larger outer diameter of upper-region 1711 to the smaller outer diameter of lower-region 1713 may be as a step, i.e., abrupt. In some embodiments, heat sink module 115 may comprise a plurality of fins 117. In some embodiments, upper-region 1711 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of upper-region 1711. In some embodiments, lower-region 1713 may be free (without) plurality of fins 117. In some embodiments, at least a portion of plurality of fins 117 may be threaded for attachment to driver cap 101. In some embodiments, at least a portion (exterior or interior) of lower-region 1713 may be threaded for attachment to holder 125. In some embodiments, a bottom interior of heat sink module 115 may be at least mostly hollow and configured for receiving LED light chip 701 and/or optical reflector 703.

Figure 17D:
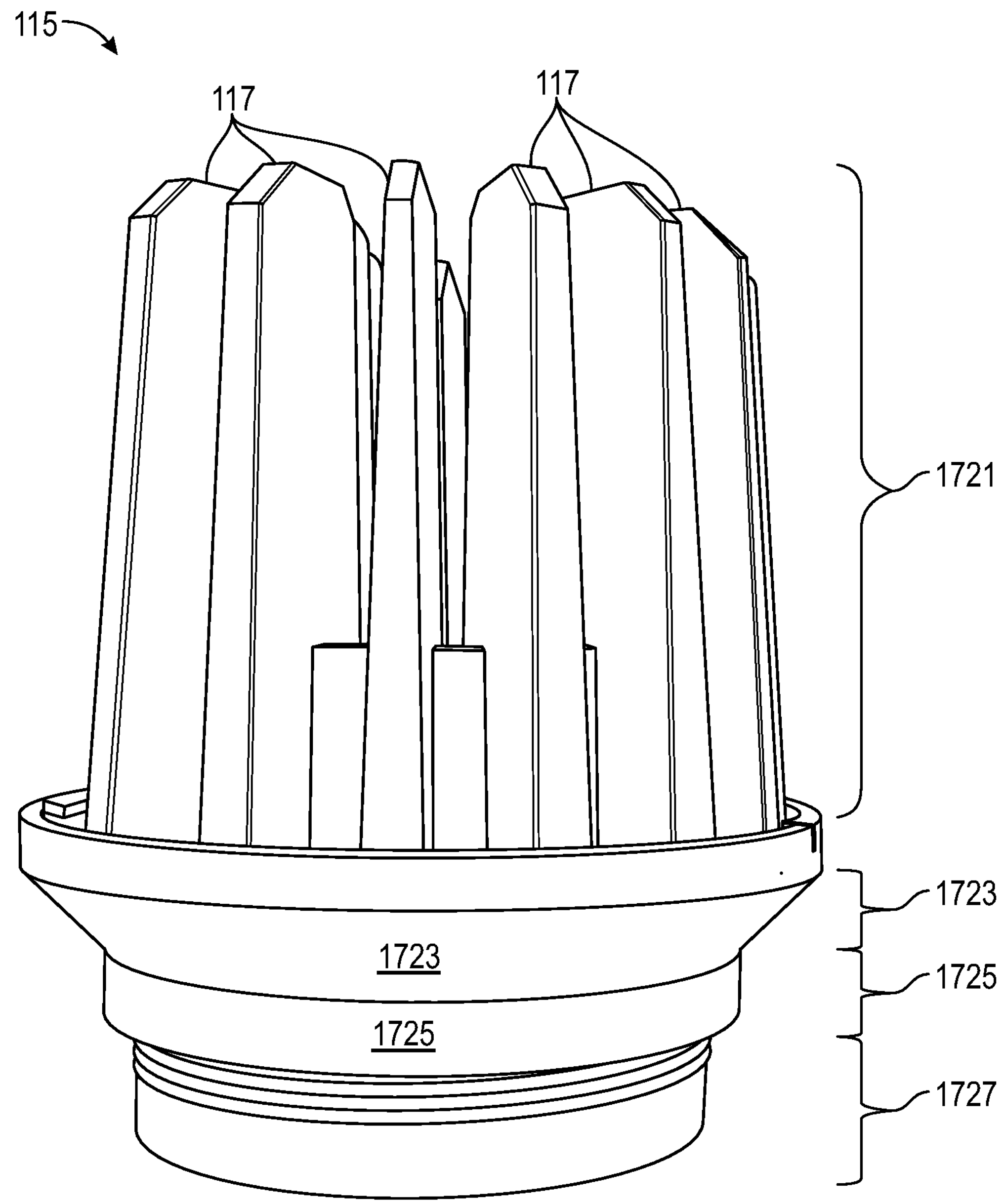
FIG. 17D (Prior Art)
FIG. 17D (prior art) shows a general side view of a heat sink module that may have a particular outer shape/appearance.

FIG. 17D shows a general side view of a heat sink module 115 that may have a particular outer shape/appearance. In some embodiments, the outer shape/appearance of heat sink module 115 may comprise three distinct regions, each of its own particular geometry, upper-finned-region 1721, conical-frustrum-region 1723, cylindrical-region 1725, and bottom-threaded-region 1727. In some embodiments, upper-finned-region 1721 may have an outer shape/appearance that may be substantially shaped as a first right cylinder (with a predetermined taper in some embodiments). In some embodiments, conical-frustrum-region 1723 may have an outer shape/appearance that may be substantially shaped as a conical frustrum. In some embodiments, cylindrical-region 1725 may have an outer shape/appearance that may be substantially shaped as a second right cylinder. In some embodiments, bottom-threaded-region 1727 may have an outer shape/appearance that may be substantially shaped as a third right cylinder. In some embodiments, conical-frustrum-region 1723 may be disposed between upper-finned-region 1721 and bottom-threaded-region 1727. In some embodiments, cylindrical-region 1725 may be disposed between upper-finned-region 1721 and bottom-threaded-region 1727. In some embodiments, conical-frustrum-region 1723 and cylindrical-region 1725 may be disposed between upper-finned-region 1721 and bottom-threaded-region 1727. In some embodiments, conical-frustrum-region 1723 may be disposed between upper-finned-region 1721 and cylindrical-region 1725. In some embodiments, cylindrical-region 1725 may be disposed between conical-frustrum-region 1723 and bottom-threaded-region 1727. In some embodiments, a top of conical-frustrum-region 1723 may be attached/connected to a bottom of upper-finned-region 1721. In some embodiments, a bottom of conical-frustrum-region 1723 may be attached/connected to a top of cylindrical-region 1725. In some embodiments, a top of cylindrical-region 1725 may be attached/connected to a bottom of conical-frustrum-region 1723. In some embodiments, a bottom of cylindrical-region 1725 may be attached/connected to a top of bottom-threaded-region 1727. In some embodiments, upper-finned-region 1721, conical-frustrum-region 1723, cylindrical-region 1725, and bottom-threaded-region 1727 may be integral with each other, i.e., as a single article of manufacture. In some embodiments, a widest outside diameter of heat sink module 115 may be at a top of conical-frustrum-region 1723. In some embodiments, a smallest outside diameter of heat sink module 115 may be at bottom-threaded-region 1727. In some embodiments, an outside diameter of bottom-threaded-region 1727 may be less than an outside diameter of cylindrical-region 1725. In some embodiments, a widest diameter of conical-frustrum-region 1723 may be located closer to a top of heat sink module 115; whereas, a narrowest diameter of conical-frustrum-region 1723 may be located closer to a bottom of heat sink module 115 (note, this may be an opposite orientation as compared to heat sink module 115 of FIG. 17B). Continuing discussing FIG. 17D, in some embodiments, with respect to an overall length/height of heat sink module 115, cylindrical-region 1725 may be shortest and upper-finned-region 1721 may be longest. In some embodiments, with respect to the overall length/height of heat sink module 115, conical-frustrum-region 1723 may be longer than cylindrical-region 1725 but shorter than upper-finned-region 1721. In some embodiments, with respect to the overall length/height of heat sink module 115, bottom-threaded-region 1727 may be longer than cylindrical-region 1725 but shorter than upper-finned-region 1721. In some embodiments, a transition from upper-finned-region 1721 to conical-frustrum-region 1723 may be as a step, i.e., abrupt. In some embodiments, a transition from a smaller outer diameter of upper-finned-region 1721 to a larger outer diameter of conical-frustrum-region 1723 may be as a step, i.e., abrupt. In some embodiments, a transition from conical-frustrum-region 1723 to cylindrical-region 1725 may not be as a step; but rather, may be smooth and seamless because an outside diameter of cylindrical-region 1725 may be substantially similar to a bottom outside diameter of conical-frustrum-region 1723. In some embodiments, a transition from cylindrical-region 1725 to bottom-threaded-region 1727 may be as a step, i.e., abrupt. In some embodiments, a transition from a larger outer diameter of cylindrical-region 1725 to a smaller outer diameter of bottom-threaded-region 1727 may be as a step, i.e., abrupt. In some embodiments, heat sink module 115 may comprise a plurality of fins 117. In some embodiments, the plurality of fins 117 may extend radially outwards away from a common longitudinal center/axis of heat sink module 115. In some embodiments, upper-finned-region 1721 may comprise at least a portion of plurality of fins 117. In some embodiments, conical-frustrum-region 1723, cylindrical-region 1725, and bottom-threaded-region 1727 may be free of (without) plurality of fins 117. In some embodiments, plurality of fins 117 may run from a bottom to a top of upper-finned-region 1721. In some embodiments, plurality of fins 117 may run from near the bottom to the top of upper-finned-region 1721. In some embodiments, at least a portion of plurality of fins 117 may be threaded for attachment to driver cap 101. In some embodiments, at least a portion of an exterior portion of bottom-threaded-region 1727 may be threaded for attachment to holder 125. In some embodiments, a bottom interior of heat sink module 115 may be at least mostly hollow and configured for receiving LED light chip 701 and/or optical reflector 703.

Figure 17E:
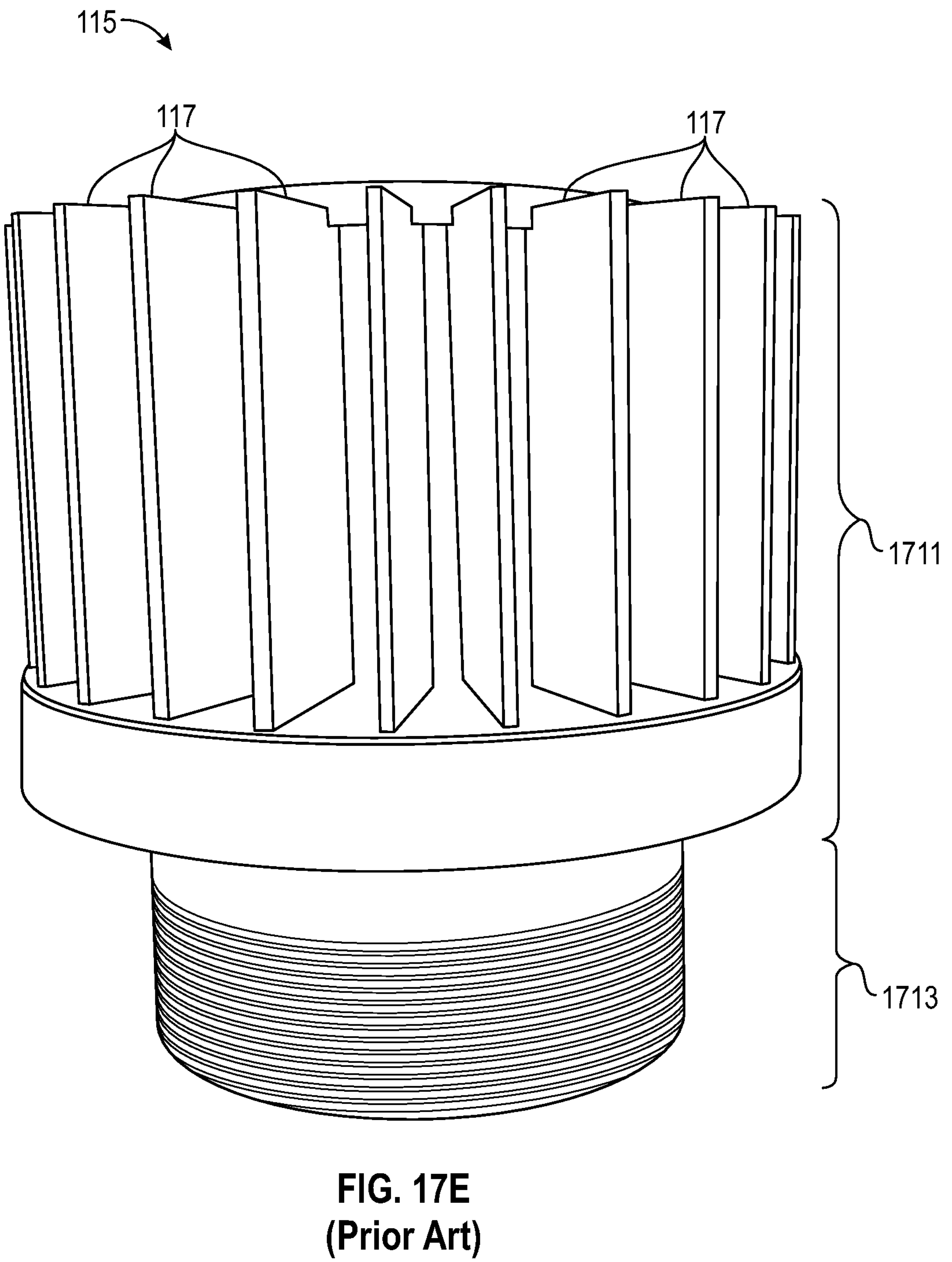
FIG. 17E (Prior Art)
FIG. 17E (prior art) shows a general side view of a heat sink module that may have a particular outer shape/appearance.

FIG. 17E shows a general side view of a heat sink module 115 that may have a particular outer shape/appearance. In some embodiments, the outer shape/appearance of heat sink module 115 may comprise two distinct regions, each of its own particular geometry, upper-region 1711 and lower-region 1713. In some embodiments, upper-region 1711 may have an outer shape/appearance that may be substantially shaped as a right cylinder. In some embodiments, lower-region 1713 may have an outer shape/appearance that may be substantially shaped as another/different right cylinder. In some embodiments, a top of lower-region 1713 may be attached/connected to a bottom of upper-region 1711. In some embodiments, upper-region 1711 and lower-region 1713 may be integral with each other, i.e., as a single article of manufacture. In some embodiments, a widest outside diameter of heat sink module 115 may be at upper-region 1711. In some embodiments, a smallest outside diameter of heat sink module 115 may be at lower-region 1713. In some embodiments, an outside diameter of upper-region 1711 may be larger than an outside diameter of lower-region 1713. In some embodiments, with respect to an overall length/height of heat sink module 115, upper-region 1711 may be taller/longer than lower-region 1713. In some embodiments, a transition from upper-region 1711 to lower-region 1713 may be as a step, i.e., abrupt. In some embodiments, a transition from the larger outer diameter of upper-region 1711 to the smaller outer diameter of lower-region 1713 may be as a step, i.e., abrupt. In some embodiments, heat sink module 115 may comprise a plurality of fins 117. In some embodiments, upper-region 1711 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of upper-region 1711. In some embodiments, plurality of fins 117 may run from near the bottom to the top of upper-region 1711. In some embodiments, lower-region 1713 may be free (without) plurality of fins 117. In some embodiments, at least a portion of plurality of fins 117 may be threaded for attachment to driver cap 101. In some embodiments, at least a portion (exterior or interior) of lower-region 1713 may be threaded for attachment to holder 125. In some embodiments, a bottom interior of heat sink module 115 may be at least mostly hollow and configured for receiving LED light chip 701 and/or optical reflector 703.

Figure 17F:
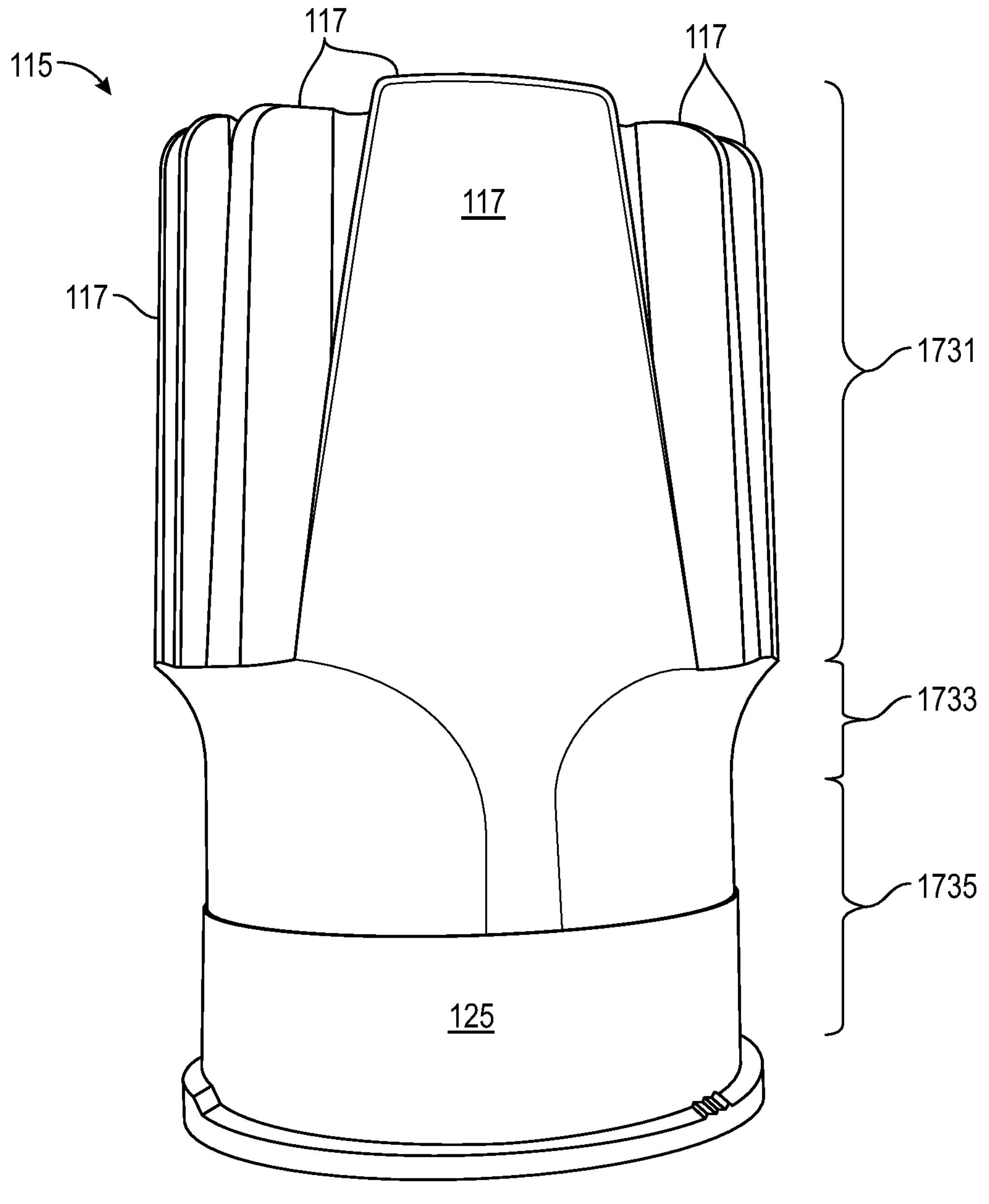
FIG. 17F (Prior Art)
FIG. 17F (prior art) shows a general side view of a heat sink module that may have a particular outer shape/appearance.
Figure 17G:
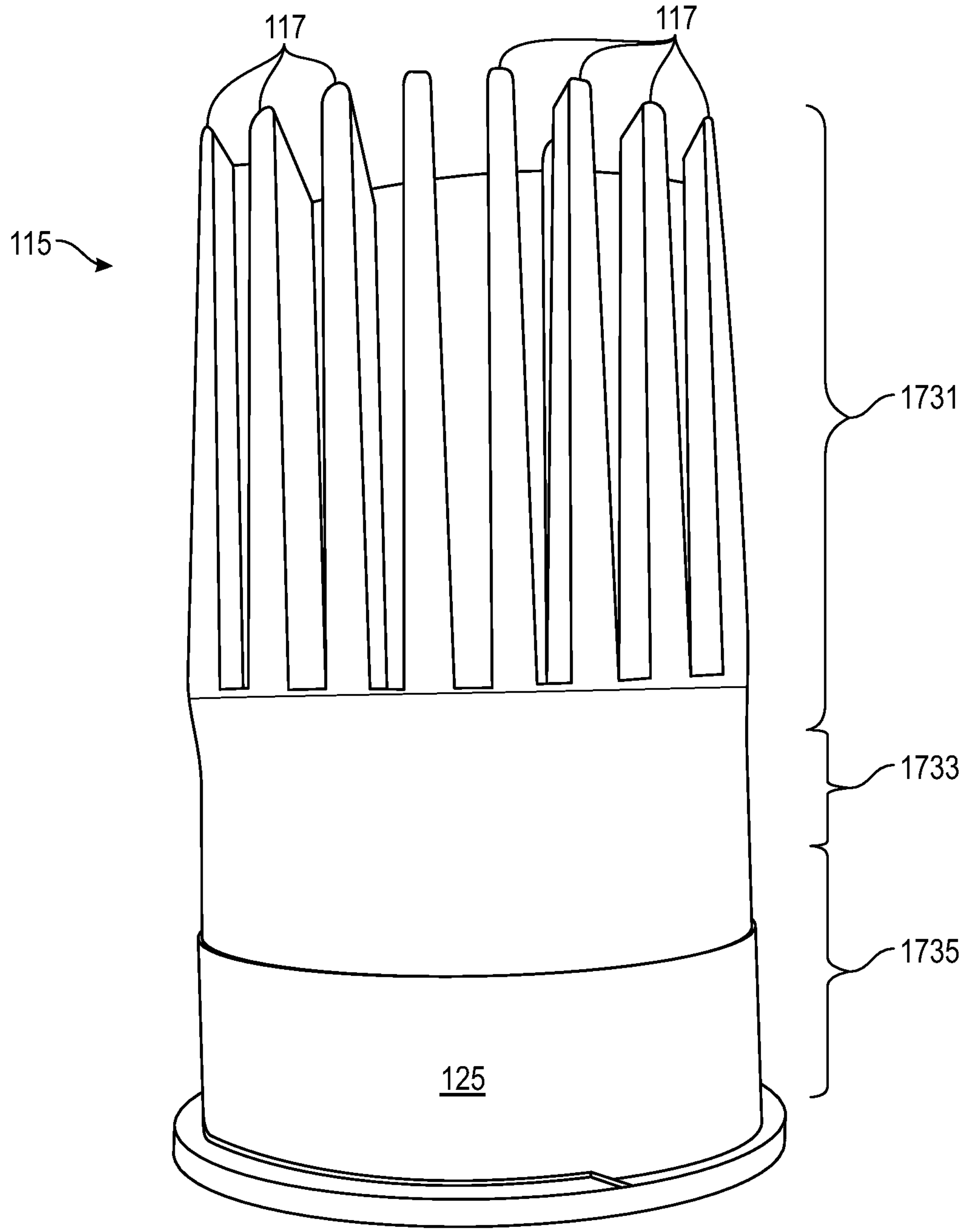
FIG. 17G (Prior Art)
FIG. 17G (prior art) shows another side view of the same heat sink module of FIG. 17F.

FIG. 17F shows a general side view of a heat sink module 115 that may have a particular outer shape/appearance. FIG. 17G shows another side view of the same heat sink module 115 of FIG. 17F. Note, FIG. 17F and FIG. 17G show different side views of a given heat sink module 115 (wherein FIG. 17F and FIG. 17G are rotated about ninety (90) degrees from each other with respect to a common longitudinal center/axis of heat sink module 115). In some embodiments, the outer shape/appearance of heat sink module 115 may comprise three distinct regions, each of its own particular geometry, finned-upper-region 1731, middle-transition-region 1733, and bottom-region 1735. In some embodiments, finned-upper-region 1731 may have an outer shape/appearance that may be substantially shaped as a right cylinder (that may taper towards the top in some embodiments). In some embodiments, middle-transition-region 1733 may have an outer shape/appearance that may be substantially shaped as conical frustrum from two opposing sides (see e.g., FIG. 17F) and that may be substantially shaped as a right cylinder from the other two remaining opposing sides (see e.g., FIG. 17G). In some embodiments, bottom-region 1735 may have an outer shape/appearance that may be substantially shaped as a right cylinder. In some embodiments, middle-transition-region 1733 may be disposed between finned-upper-region 1731 and bottom-region 1735. In some embodiments, a top of middle-transition-region 1733 may be attached/connected to a bottom of finned-upper-region 1731. In some embodiments, a bottom of middle-transition-region 1733 may be attached/connected to a top of bottom-region 1735. In some embodiments, finned-upper-region 1731, middle-transition-region 1733, and bottom-region 1735 may be integral with each other, i.e., as a single article of manufacture. In some embodiments, a widest outside diameter of heat sink module 115 may be at a bottom of finned-upper-region 1731 and/or at a top of middle-transition-region 1733. In some embodiments, a smallest outside diameter of heat sink module 115 may be at a bottom of bottom-region 1735. In some embodiments, an outside diameter of bottom-region 1735 may be less than an outside diameter of finned-upper-region 1731. In some embodiments, a widest diameter of middle-transition-region 1733 may be located closer to a top of heat sink module 115; whereas, a narrowest diameter of middle-transition-region 1733 may be located closer to a bottom of heat sink module 115. In some embodiments, with respect to an overall length/height of heat sink module 115, middle-transition-region 1733 may be shortest and finned-upper-region 1731 may be longest. In some embodiments, with respect to the overall length/height of heat sink module 115, bottom-region 1735 may be longer than middle-transition-region 1733 but shorter than finned-upper-region 1731. In some embodiments, a transition from finned-upper-region 1731 to middle-transition-region 1733 may not be as a step; but rather, may be smooth and seamless as an outside diameter of a bottom of finned-upper-region 1731 may be substantially similar to an outside diameter of a top of middle-transition-region 1733. In some embodiments, a transition from middle-transition-region 1733 to bottom-region 1735 may not be as a step; but rather, may be smooth and seamless as an outside diameter of a bottom of middle-transition-region 1733 may be substantially similar to an outside diameter of a top of bottom-region 1735. In some embodiments, middle-transition-region 1733 may be a region where finned-upper-region 1731 transitions into bottom-region 1735. In some embodiments, heat sink module 115 may comprise a plurality of fins 117. In some embodiments, finned-upper-region 1731 may comprise at least a portion of plurality of fins 117. In some embodiments, middle-transition-region 1733 and bottom-region 1735 may be free of (without) plurality of fins 117. In some embodiments, major planes of the plurality of fins 117 may be at least substantially parallel with each other. In some embodiments, plurality of fins 117 may run from a bottom to a top of finned-upper-region 1731. In some embodiments, at least an exterior portion of plurality of fins 117 may be threaded for attachment to driver cap 101. In some embodiments, at least a portion of bottom-region 1735 (exterior or interior) may be threaded for attachment to holder 125. In some embodiments, a bottom interior of heat sink module 115 may be at least mostly hollow and configured for receiving LED light chip 701 and/or optical reflector 703.

Figure 17H:
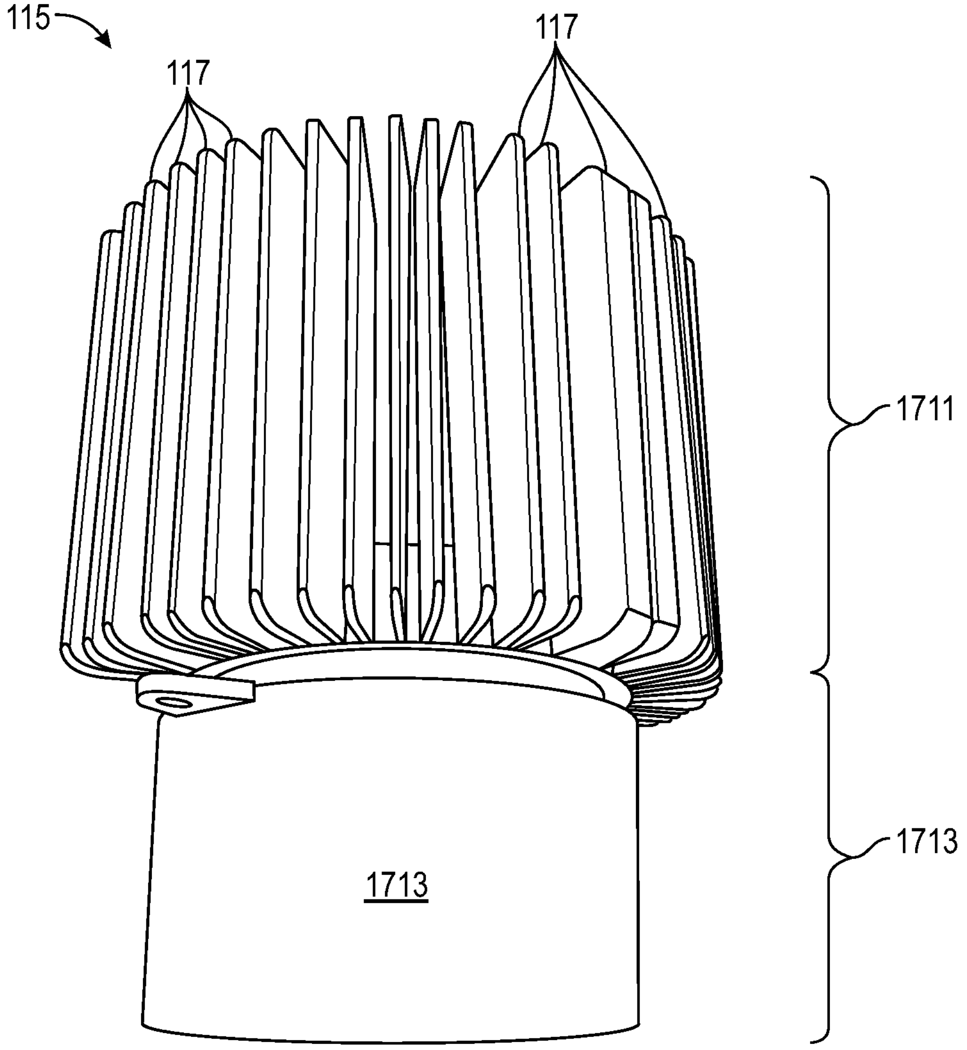
FIG. 17H (Prior Art)
FIG. 17H (prior art) shows a general side view of a heat sink module that may have a particular outer shape/appearance.

FIG. 17H shows a general side view of a heat sink module 115 that may have a particular outer shape/appearance. In some embodiments, the outer shape/appearance of heat sink module 115 may comprise two distinct regions, each of its own particular geometry, upper-region 1711 and lower-region 1713. In some embodiments, upper-region 1711 may have an outer shape/appearance that may be substantially shaped as a right cylinder. In some embodiments, lower-region 1713 may have an outer shape/appearance that may be substantially shaped as another/different right cylinder. In some embodiments, a top of lower-region 1713 may be attached/connected to a bottom of upper-region 1711. In some embodiments, upper-region 1711 and lower-region 1713 may be integral with each other, i.e., as a single article of manufacture. In some embodiments, a widest outside diameter of heat sink module 115 may be at upper-region 1711. In some embodiments, a smallest outside diameter of heat sink module 115 may be at lower-region 1713. In some embodiments, an outside diameter of upper-region 1711 may be larger than an outside diameter of lower-region 1713. In some embodiments, with respect to an overall length/height of heat sink module 115, upper-region 1711 may be taller/longer than lower-region 1713. In some embodiments, heat sink module 115 may comprise a plurality of fins 117. In some embodiments, upper-region 1711 may comprise at least a portion of plurality of fins 117. In some embodiments, the plurality of fins 117 may extend radially outwards away from a common longitudinal center/axis of heat sink module 115. In some embodiments, plurality of fins 117 may run from a bottom to a top of upper-region 1711. In some embodiments, lower-region 1713 may be free (without) plurality of fins 117. In some embodiments, at least a portion of plurality of fins 117 may be threaded for attachment to driver cap 101. In some embodiments, at least a portion (exterior or interior) of lower-region 1713 may be threaded for attachment to holder 125. In some embodiments, a bottom interior of heat sink module 115 may be at least mostly hollow and configured for receiving LED light chip 701 and/or optical reflector 703.

Note, in some embodiments, attachment between heat sink modules 115 of FIG. 17A to FIG. 17H to driver caps 101 and/or to holders 125 may be as shown and described in FIG. 1 to FIG. 11, FIG. 13A to FIG. 13I, FIG. 14A to FIG. 14C, FIG. 15, and/or FIG. 16A to FIG. 16C.

In some embodiments, most (a majority of) fins selected from plurality of fins 117 may have a same/uniform/constant thickness; whereas, in some embodiments, a minority of fins selected from plurality of fins 117 may have a thicker thickness than the remaining fins selected from plurality of fins 117.

In some embodiments, integrated-lighting-module 100 may comprise a driver cap 101 (driver housing 101), a heat sink module 115, at least one LED light chip 701, at least one optical reflector 703, and a holder 125. In some embodiments, integrated-lighting-module 100, driver cap 101 (driver housing 101), heat sink module 115, LED light chip 701, optical reflector 703, and holder 125 may be as previously described and discussed above and/or as shown in the drawing figures.

In some embodiments, driver housing 101 may have side walls 103 of driver housing 101 and top 105 of driver housing 101 that may at least mostly cap side walls 103. In some embodiments, side walls 103 of driver housing 101 and top 105 of driver housing 101 may substantially surround a driver-volume 1501 of driver housing 101. In some embodiments, driver-volume 1501 may be configured to receive a driver that is configured to provide electrical power to at least one light emitting diode element 701. See e.g., FIG. 1, FIG. 11, and FIG.

In some embodiments, heat sink module 115 may be configured for transferring at least some heat away from at least one light emitting diode element 701. In some embodiments, at least some of a top region of heat sink module 115 may be in communication to at least some of a bottom region of driver housing 101 (and a nature of that communication may be as shown and discussed with respect to FIG. 13A to FIG. 13I). See e.g., FIG. 1, FIG. 11, and FIG. 15.

In some embodiments, at least one light emitting diode element 701 may be configured to emit light. In some embodiments, at least one light emitting diode element 701 may be in communication with at least a portion of heat sink module 115. In some embodiments, a nature of that communication may be that at least one light emitting diode element 701 is attached to some portion of heat sink module 115. See e.g., FIG. 1, FIG. 11, and FIG. 15.

In some embodiments, at least one optical reflector 703 may be at least substantially shaped as a conical frustum. In some embodiments, at least one optical reflector 703 may be configured for reflecting and directing at least some light from at least one light emitting diode element 701 out of bottom 1133 of at least one optical reflector 703. In some embodiments, at least one light emitting diode element 701 may be disposed above top-hole 1131 of at least one optical reflector 703. In some embodiments, top-hole 1131 may be located at a top portion of the optical reflector 703 and disposed opposite from the bottom 1133 of least one optical reflector 703. See e.g., FIG. 1, FIG. 11, and FIG. 15.

In some embodiments, holder 125 may be configured to trap at least one optical reflector 703 between at least some elements of holder 125 and at least some elements of heat sink module 115. In some embodiments, holder 125 may be in communication with heat sink module 115 (and a nature of that communication may be as shown and discussed with respect to FIG. 13A to FIG. 13I). In some embodiments, the communication between holder 125 and heat sink module 115 may be attachment to each other. In some embodiments, the attachment between holder 125 and heat sink module 115 may be done by a complimentary threading connection. See e.g., FIG. 1, FIG. 11, FIG. 13A to FIG. 13I, and FIG. 15.

In some embodiments, when integrated-lighting-module 100 may be an assembled configuration, driver housing 101 may be attached to heat sink module 115, heat sink module 115 may be attached to at least one light emitting diode element 701, heat sink module 115 may be attached to holder 125 with the at least one optical reflector 703 trapped between at least some elements of holder 125 and at least some elements of heat sink module 115. See e.g., FIG. 1, FIG. 11, FIG. 13A to FIG. 13I, FIG. 14A to FIG. 14C, and FIG. 15.

In some embodiments, when integrated-lighting-module 100 may be an assembled configuration, integrated-lighting-module 100 may have an overall height (overall length), wherein with respect to that overall height (overall length), driver housing 101 may be located at an overall top of integrated-lighting-module 100 and holder 125 may be located at an overall bottom of integrated-lighting-module 100; such that driver housing 101 and holder 125 may be disposed opposite of each other (along that overall height [overall length]), and such that driver housing 101 may be located entirely above heat sink module 115. See e.g., FIG. 1, FIG. 11, FIG. 13A to FIG. 13I, FIG. 14A to FIG. 14C, and FIG. 15.

In some embodiments, integrated-lighting-module 100 may be configured to receive 120 V (volts), A/C (alternating current), as an input. In some embodiments, integrated-lighting-module 100 may be configured to receive 110 V (volts), A/C, as an input. In some embodiments, integrated-lighting-module 100 may be configured to receive other predetermined voltages as an input.

In some embodiments, at least some portion of a given integrated-lighting-module (such as, but not limited to, integrated-lighting-module 100) may be sized for direct communication (e.g., physical attachment and/or receiving) with a trim (such as, but not limited to, trim 1221) that has an upper opening with a diameter dimension selected from a range of one-half (0.5) inch to two and one-half (2.5) inches. In some embodiments, this diameter (of the upper opening at the trim) may be selected from a range from one and one-half (1.5) inches to two and one-quarter (2.25) inches. In some embodiments, the trim may have an upper opening to accept the given integrated-lighting-module from a range of one-half (0.5) inch to two and one-half (2.5) inches. In some embodiments, the trim may have an upper opening to accept the given integrated-lighting-module from a range of one and one-half (1.5) inches to two and one-quarter (2.25) inches. In some embodiments, this upper opening at the top of the trim may be at least mostly/substantially circular.

In some embodiments, integrated-lighting-module 100 may be used with trim 1221 that may be sized "MR16." In some embodiments, trim 1221 may be another predetermined sized trim. In some embodiments, integrated-lighting-module 100 may be used with trim 1221 that may have a three-inch size; and with adjustability of integrated-lighting-module 100.

In some embodiments, driver cap 101, heat sink module 115, and/or holder 125 may have exterior shapes that are at least substantially (mostly): right cylindrical; conical frustrum; funnel; with or without fin(s); with or without annular exterior flange(s); with or without outside threading; with or without inside threading; portions thereof, combinations thereof, and/or the like. In some embodiments, holder 125 may have at least some elements that are substantially shaped as a conical frustum.

In some embodiments, holder 125 may be a trim part/component. In some embodiments, holder 125 may be replaced with a trim/part component. In some embodiments, holder 125 and optical reflector 703 may be combined into a single integral article of manufacture. In some embodiments, holder 125, optical reflector 703, and a trim part/component may be combined into a single integral article of manufacture.

In some embodiments, integrated-lighting-module 100, driver cap 101, heat sink module 115, and/or holder 125 may comprise one or more aperture(s), such as, but not limited to aperture 109, 1117, 1119, and/or 1121. In some embodiments, these apertures may be holes, such as through holes in material of integrated-lighting-module 100, driver cap 101, heat sink module 115, and/or holder 125. In some embodiments, these apertures may be configured to receive one or more mechanical fastener(s) (such as, but not limited to, screw(s), bolt(s), nail(s), pin(s), rod(s), dowel(s), brad(s), tack(s), staple(s), and/or the like). In some embodiments, these apertures may be configured for passing at least one wire through the given aperture. In some embodiments, a top region of heat sink module 115 may comprise at least one such aperture. In some embodiments, a non-finned region of heat sink module 115 may comprise at least one such aperture. In some embodiments, a finned region of heat sink module 115 may comprise at least one such aperture.

In some embodiments, fin(s) (such as, but not limited to, fin(s) 117) of heat sink module 115 may be configured to transfer heat out of and/or away from at least portions of one or more of: heat sink module 115, LED light chip 701, a driver (e.g., within driver cap 101), portions thereof, combinations thereof, and/or the like. In some embodiments, a given heat sink module 115 may have fin(s) (such as, but not limited to, fin(s) 117) anywhere on that given heat sink module 115. In some embodiments, side-wall(s) 119 (of a given heat sink module 115) may have fin(s) (such as, but not limited to, fin(s) 117) anywhere on that given sidewall(s) 119. In some embodiments, fin(s) (such as, but not limited to, fin(s) 117) may be on one or more of: a top (upper) region of heat sink module 115, a middle region of heat sink module 115, a bottom region of heat sink module 115, portions thereof, combinations thereof, and/or the like. In some embodiments, fin(s) (such as, but not limited to, fin(s) 117) may be part of one or more of: a top (upper) region of heat sink module 115, a middle region of heat sink module 115, a bottom region of heat sink module 115, portions thereof, combinations thereof, and/or the like. In some embodiments, fin(s) (such as, but not limited to, fin(s) 117) may be on one or more of: a top (upper) region of side-wall(s) 119, a middle region of sidewall(s) 119, a bottom region of side-wall(s) 119, portions thereof, combinations thereof, and/or the like. In some embodiments, fin(s) (such as, but not limited to, fin(s) 117) may be part of one or more of: a top (upper) region of side-wall(s) 119, a middle region of side-wall(s) 119, a bottom region of side-wall(s) 119, portions thereof, combinations thereof, and/or the like. In some embodiments, fin(s) (such as, but not limited to, fin(s) 117) of heat sink module 115 may have outside threading on them and/or may have inside threading on them. In some embodiments, threading on fin(s) such as, but not limited to, fin(s) 117) of heat sink module 115 may be configured for attachment to driver cap 101 and/or holder 125.

In some embodiments, heat sink module 115 may have inside threading around inside diameter(s) of heat sink module 115; and/or heat sink module 115 may have outside threading around outside diameter(s) of heat sink module 115. In some embodiments, such threading on heat sink module 115 may be configured for attachment to driver cap 101 and/or holder 125.

In some embodiments, integrated-lighting-module 100 may include sufficient space for a driver to be flush with a top of integrated-lighting-module 100. For example, and without limiting the scope of the present invention, the driver may be located substantially within driver cap 101 (e.g., within volume 1501).

At least some components of integrated-lighting-module 100 may be 3D (three dimensional) printed, injection molded, cast, stamped, die cast, die cut, extruded, and/or the like.

Note, any ranges noted herein may include one or both endpoints of the given disclosed range.

An integrated-lighting-module and a system using an integrated-lighting-module have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An integrated lighting module comprising: a heat sink module that is configured for transferring at least some heat away from at least one light emitting diode element; the at least one light emitting diode element that is configured to emit light; wherein the at least one light emitting diode element is housed within the heat sink module; at least one optical reflector that is substantially shaped as a conical frustum that is configured for reflecting and directing at least some light from the at least one light emitting diode element out of a bottom of the at least one optical reflector; wherein the at least one light emitting diode element is disposed above a top-hole of the at least one optical reflector, wherein the top-hole is located at a top portion of the at least one optical reflector and disposed opposite from the bottom of the least one optical reflector; and a holder that is configured to trap the at least one optical reflector between at least some elements of the holder and at least some elements of the heat sink module, wherein the holder is in communication with the heat sink module and wherein the holder has elements that are substantially shaped as a conical frustum.

2. The integrated lighting module according to claim 1, wherein the heat sink module comprises a plurality of fins, wherein the plurality of fins are configured to transfer the at least some heat away from the at least one light emitting diode element.

3. The integrated lighting module according to claim 1, wherein the at least one light emitting diode element is radially surrounded by portions of the heat sink module.

4. The integrated lighting module according to claim 1, wherein the at least one light emitting diode element is attached a bottom central portion of the heat sink module.

5. The integrated lighting module according to claim 1, wherein the top region of the heat sink module comprises at least one aperture.

6. The integrated lighting module according to claim 5, wherein the at least one aperture is configured to receive a mechanical fastener.

7. The integrated lighting module according to claim 1, wherein a non-finned region of the heat sink module comprises at least one aperture.

8. The integrated lighting module according to claim 7, wherein the at least one aperture is configured for passing at least one wire through the at least one aperture.

9. The integrated lighting module according to claim 1, wherein the heat sink module comprises at least one aperture that is configured for passing at least one wire through the at least one aperture.

10. The integrated lighting module according to claim 1, wherein the communication between the holder and heat sink module is attachment to each other.

11. The integrated lighting module according to claim 10, wherein the attachment between the holder and heat sink module is done by a complimentary threading connection.

12. The integrated lighting module according to claim 1, wherein a bottom portion of the holder has an annular flange.

13. The integrated lighting module according to claim 1, wherein when the integrated lighting module is an assembled configuration the heat sink module is attached to the at least one light emitting diode element, the heat sink module is attached to the holder with the at least one optical reflector trapped between the at least some elements of the holder and the at least some elements of the heat sink module.

14. The integrated lighting module according to claim 1, wherein the holder has an upper opening with a diameter dimension selected from a range of one-half (0.5) inch to two and one-half (2.5) inches; wherein the upper opening is in communication with at least some portion of the heat sink module.

15. The integrated lighting module according to claim 1, wherein at least some portion of the integrated lighting module is sized for direct communication with a trim that has an upper opening with a diameter dimension selected from a range of one-half (0.5) inch to two and one-half (2.5) inches.

16. The integrated lighting module according to claim 1, wherein the integrated lighting module further comprises a driver housing that is configured to house a driver, wherein the driver is configured to provide electrical power to the at least one light emitting diode element; wherein at least some of a top region of the heat sink module is in direct physical communication to at least some of a bottom region of the driver housing when the integrated lighting module is an assembled configuration.

17. The integrated lighting module according to claim 16, wherein when the integrated lighting module is the assembled configuration, the integrated lighting module has an overall height, wherein with respect to the overall height, the driver housing is located at an overall top of the integrated lighting module and the holder is located at an overall bottom of the integrated lighting module, such that the driver housing and the holder are disposed opposite of each other, and such that the driver housing is located entirely above the heat sink module.

* * * * *